US007728091B2

(12) United States Patent
Gates et al.

(10) Patent No.: US 7,728,091 B2
(45) Date of Patent: Jun. 1, 2010

(54) POLYMERIZATION OF PHOSPHAALKENES

(75) Inventors: Derek Gates, Vancouver (CA); Chi-Wing Tsang, Vancouver (CA); Mandy Yam, Richmond (CA)

(73) Assignee: The University of British Columbia, Vancouver, British Columbia (CA)

( * ) Notice: Subject to any disclaimer, the term of this patent is extended or adjusted under 35 U.S.C. 154(b) by 1080 days.

(21) Appl. No.: 10/539,397

(22) PCT Filed: Dec. 16, 2003

(86) PCT No.: PCT/CA03/01982

§ 371 (c)(1),
(2), (4) Date: Jan. 17, 2006

(87) PCT Pub. No.: WO2004/055098

PCT Pub. Date: Jul. 1, 2004

(65) Prior Publication Data

US 2006/0270805 A1 Nov. 30, 2006

Related U.S. Application Data

(60) Provisional application No. 60/433,507, filed on Dec. 16, 2002.

(51) Int. Cl.
*C08F 30/02* (2006.01)
(52) U.S. Cl. .................. 526/274; 526/173; 526/328.5; 526/339; 526/347
(58) Field of Classification Search .............. 526/173, 526/274, 328.5, 339, 347
See application file for complete search history.

(56) References Cited

U.S. PATENT DOCUMENTS 5,698,664 A    12/1997    Allcock et al.

FOREIGN PATENT DOCUMENTS

| FR | 1299992 | 7/1962 |
|----|---------|--------|
| FR | 1327030 | 5/1963 |
| GB | 898759 | 6/1962 |
| GB | 906408 | 9/1962 |
| GB | 1021016 | 2/1966 |
| JP | 06016508 | 1/1994 |
| SU | 914569 | 3/1982 |

OTHER PUBLICATIONS

Allcock, "Inorganic-Organic Polymers". Adv. Mater. (1994) 6(2):106-115.
Allcock, et al, "Properties of Poly(phosphazene-siloxane) Block Copolymers Synthesized via Telechelic Polyphosphazenes and Polysiloxane Phosphoranimines"; Macromolecules (2001) 34(20):6858-6865.
Archer, Inorganic and Organometallic Polymers; Wiley-VCH: New York, 2001 (5 pages).
Carré et al., "Preparation and Structure of Phosphonium Ions With Intramolecular P←N Coordination; Novel Diphosphonium Salts and Ionomer Containing Backbone Hypervalent Phosphorus". Eur. J. Inorg. Chem. (2000) 4:647-653.
Chow, et al, "Thermochemistry of Methylenephosphine: Determination of the Carbon-Phosphorus Double-Bond Strength". J.Phys. Chem. (1989) 93:421-426.
Chunechom, et al., "Thionylphosphazene Monomers and Polymers—the Synthesis of Alternating Copolymers of Phosphazenes and Oxothiazenes". Angew.Chem.Int.Ed. (1998) 37(13/14):1928-1930.
Cowley, "Double Bonding Between the Heavier Main-Group Elements: From Reactive Intermediates to Isolable Molecules". Polyhedron (1984) 3(4):389-432.
Dillon et al, Phosphorus: The Carbon Copy; Wiley: New York (1998), Chapter 5, pp. 88-127.
Dorn et al., "Transition Metal-Catalyzed Formation of Phosphorus-Boron Bonds: A New Route to Phosphinoborane Rings, Chains and Macromolecules". J.Am.Chem.Soc. (2000) 122(28):6669-6678.
Driess et al, "Main Group Element Analogues of Carbenes, Olefins, and Small Rings". Angew.Chem.Int.Ed.Engl. (1996) 35(8):828-856.
Eshtiagh-Hosseini et al., $^{19}$F and $^{31}$P NMR Characterisation of the Phosphaalkene, $CF_3P=CF_2$, Intermediate in the Alkaline Hydrolysis of Bis(trifluoromethyl)phosphine; Journal of Organometallic Chemistry (1979) 181:C1-C3.
Gates, Slide presentation entitled "The Utility of the Phosphorous-Carbon Multiple Bond in Polymer Synthesis". Corfu, Greece, Jun. 2002. International Conference on Organometallic Chemistry (ICOMC Conference) (5 pages).
Gates, Department Seminar, University of Manitoba, Dec. 16, 2002, Slide presentation entitled "A Role for Main Group Multiple Bonds in Polymer Synthesis: New P-C Polymers" (20 pages).
Gavrilova et al., "Reaction of amides of phosphorus (III) acids with α-bromostyrene in the presence of NiBr2". Zhurnal Obshchei Khimii (1995) 65(9):1575 (with English Abstract).
Hackney et al., "A new class of silicon-phosphorus heterocycles: 4-silaphosphorinanes". Journal of Organometallic Chemistry (1989) 359:C36-40.
Hashidzume et al., "Polymerization of Azastyrene Derivatives. 3. Preparation and Polymerization of N-Methyleneaniline". Macromolecules (1998) 31(2):535-537.
Issleib et al., "Carbosilylierte Phospha-alkene". Z.anorg.allg.Chem. (1981) 473(2):85-90.
Jutzi, "Stable Systems with a Triple Bond to Silicon or Its Homologues: Another Challenge". Angew.Chem.Int.Ed. (2000) 39(21):3797-3800.

(Continued)

*Primary Examiner*—Helen L. Pezzuto
(74) *Attorney, Agent, or Firm*—Christie, Parker & Hale, LLP

(57) ABSTRACT

Methods for polymerization of phosphaalkenes using initiators are provided. Also provided are polymers and co-polymers in which the polymer backbone contains tracts of carbon and phosphorous atoms in approximately equimolar amounts. C—P bonds in the polymers of this invention may be predominantly in a head-to-tail arrangement or mixed arrangements. Co-polymers may comprise polyolefin monomer units.

22 Claims, 5 Drawing Sheets

OTHER PUBLICATIONS

Kadokawa et al., "New Ring-Opening Polymerization of Phosphorus-Containing Cyclic Monomers". Phosphorous, Sulfur and Silicon (2002) 177:1387-1390.

Kanbara et al., "Palladium-Catalyzed Polycondensation of Diiodobenzenes with 1,3-Bis(phenylphosphino) propane and Preparation of Polymer Transition-Metal Complexes". Macromolecules (2000) 33:657-659.

Kanbara et al., "Preparation of Poly(arylenediphosphine)s by Palladium-Catalyzed Polycondensation: Formation of Polymer Transition-Metal Complexes and Catalytic Reactions". Journal of Polymer Science: Part A: Polymer Chemistry (2002) 40:2637-2647.

Klebach et al., "Synthesis of P-Mesityldiphenylmethylenephosphine: A Stable Compound with a Localized P=C Bond". J.Am.Chem.Soc. (1978) 100(15):4886-4888.

Kobayashi et al, "Ring-opening polymerization 1-(2,4,6-tri-*tert*-butylphenyl)- phosphirane: direct synthesis of a polyphosphine derivative". Macromolecular Rapid Communications (1994) 15(6):567-571.

Koe et al., "Synthesis and Spectroscopic Characterization of Heteroatom Polysilyenes: Poly(dialkoxysilylene)s and Evidence for Silicon σ-oxygen *n* Mixing Interaction". Macromolecules (2001) 34(4):706-712.

Kroto et al., "The Microwave Spectrum of Phosphaethene, $CH_2$=PH". J.C.S. Chem.Comm. (1980), p. 709.

Lienhard et al., "Synthesis and Characterization of the New Fluoropolymer Poly(difluorosilylenemethylene); An Analogue of Poly(vinylidene fluoride)". J.Am.Chem.Soc. (1997) 119(49):12020-12021.

Lu et al, "Poly(diaryl)stannanes: Influence of Substituents on the σ-σ* Transition Energy". Macromolecules (2000) 33(7):2403-2412.

Manners, "Polymers and the Periodic Table: Recent Developments in Inorganic Polymer Science". Angew.Chem.Int.Ed.Engl. (1996) 35(15):1602-1621.

Maraval et al., "Rapid Synthesis of Phosphorus-Containing Dendrimers with Controlled Molecular Architectures: First Example of Surface-Block, Layer-Block, and Segment-Block Dendrimers Issued from the Same Dendron". J.Am.Chem.Soc. (2000) 122(11):2499-2511.

Mark et al, Inorganic Polymers; Prentice Hall: New Jersey, 1992 (5 pages).

Mathey, "Expanding the Analogy between Phosphorus-Carbon and Carbon-Carbon Double Bonds". Acc.Chem.Res. (1992) 25(2):90-96.

Naka et al, "Synthesis of Poly(vinylene-arsine)s: Alternating Radical Copolymerization of Arsenic Atomic Biradical Equivalent and Phenylacetylene". J.Am.Chem.Soc. (2002) 124(23):6600-6603.

Niecke et al, "Iminophosphanes: Unconventional Compounds of Main Group Elements". Angew.Chem.Int.Ed.Engl. (1991) 30(3):217-237.

Norman, "Stable Compounds of the Heavier Group 14 and 15 Elements Involving pπ-pπ Multiple Bonding: An Overview of the First Decade". Polyhedron (1993) 12(20):2431-2446.

Obata et al., "Synthesis of New Linear Polymers Containing Phosphorus Atom in the Main Chain by the Radical Polyaddition: Addition Polymers of Phenylphosphine with 1,4-Divinylbenzene or 1,4-Diisopropenylbenzene and Their Properties". Journal of Polymer Science: Part A:, Polymer Chemistry (1994) 32:475-483.

Pangborn et al., "Safe and Convenient Procedure for Solvent Purification.", J. Organometallics (1996) 15(5):1518-1520.

Patten et al, ""Living" Titanium(IV) Catalyzed Coordination Polymerizations of Isocyanates. J.Am.Chem.Soc. (1991) 113(13):5065-5066.

Power, "π-Bonding and the Lone Pair Effect in Multiple Bonds between Heavier Main Group Elements". Chem.Rev. (1999) 99(12):3463-3503.

Power, "Homonuclear multiple bonding in heavier main group elements.", J.Chem.Soc., Dalton Trans. (1998) 18:2939-2951.

Regitz, "Phosphaalkynes: New Building Blocks in Synthetic Chemistry", Chem.Rev. (1990) 90(1):191-213.

Sanji et al, "Helical-Sense Programming through Polysilane-Poly(triphenylmethyl methacrylate) Block Copolymers", J.Am.Chem.Soc. (2001) 123(50):12690-12691.

Sharkey, "Polymerization through the Carbon-Sulfur Double Bond", Adv. Polym. Sci. (1974) 17:73-103.

Tsang et al., "Radical Copolymerization of a Phosphaalkene with Styrene: New Phosphine-Containing Macromolecules and Their Use in Polymer-Supported Catalysis". Angew.Chem.Int.Ed. (2004) 43:5682-5685.

Tsang et al, "The Addition Polymerization of a P=C Bond: A Route to New Phosphine Polymers". J.Am.Chem. Soc. (2003) 125(6):1480-81.

van der Knaap et al, "A Nucleophilic Reaction of a Phosphaalkene: The Methylation of Mesityldiphenylmethylenephosphine". Tet Lett (1982) 23(19):2037-2040.

Vogl, "Addition Polymers of Aldehydes.", J. Polym. Sci: Part A: Polymer Chemistry (2000) 38(13):2293-2299.

Walker et al, "Synthesis and Size Control of Gold Nanoparticles Stabilized by Poly(methylphenylphosphazene)". J.Am.Chem.Soc. (2001) 123(16):3846-3847.

Weber, "Phosphaalkenes with Inverse Electron Density", Eur. J. Inorg. Chem. (2000) 2000(12):2425-2441.

West, "Chemistry of the Silicon-Silicon Double Bond", Angew. Chem.Int.Ed.Engl. (1987) 26(12):1201-1211.

Wright et al, "Poly(*p*-phenylenephosphaalkene): A π-Conjugated Macromolecule Containing P=C bonds in the Main Chain". Agnew. Chem.Int.Ed. (2002) 41(13):2389-2392.

Yoshifuji, "Sterically protected organophosphorus compounds in low co-ordination states". J.Chem.Soc., Dalton Trans. (1998) 20:3343-3349.

International Search Report dated Jun. 28, 2004, of corresponding PCT/CA2003/001982.

S. Kobayashi, et al., "Kinetic Studies on Cationic Ring-Opening Polymerization of 2-Phenyl-1,2-oxaphospholane," Macromolecules 1984, vol. 17, pp. 107-110, XP-002283598.

B. L. Lucht, et al., "Synthesis and characterization of poly(*p*-phenylenephosphine)s," Chem. Commun., 2000, pp. 2097-2098, XP-002283599.

A. Kanazawa, et al., "Polymeric Phosphonium Salts as a Novel Class of Cationic Biocides. IV. Synthesis and Antibacterial Activity of Polymers with Phosphonium Salts in the Main Chain," Journal of Polymer Science, Part A, Polymer Chemistry, vol. 31, pp. 3031-3038, 1993, XP-002283600.

T. J. Peckham, et al., (1999) Macromolecules 32:2830-37 (On Order).

M. A. Fox, et al., (1991) Macromolecules 24:4626 (On Order).

T. .C. Klebach, et al., (1978) J. Am. Chem. Soc. 100:4886-8 (On Order).

B. Pellerin, et al., (1987) Tetrahedron Letters 28:5811 (On Order).

L. D. Quin, et al., (1987) Tetrahedron Letters 28:5783-86 (On Order).

J. R. Chow, et al., (1989) J. Phys. Chem. 93:421-6 (On Order).

A. C. Gaumont, et al., (1994) J. Chem. Soc. Chem. Commun. 945-6 (On Order).

R. A. Aitken, et al., (1997) Tetrahedron Letters 38:8417-20 (On Order).

A. C. Gaumont, et al., (1994) Chem. Rev. 94:1413-39 (On Order).

T. A. Van Der Knapp, et al., (1984) Tetrahedron 40:765-5 (On Order).

O. Mundt, et al., (1986) Z. Anorg. Allg. Chem. 540/541:319-35 (On Order).

R. Appel, (1990) "Multiple Bonds ad Low Coordination in Phosphorus Chemistry", Chapter 4 (On Order).

R. Appel, et al., (1984) Angew. Chem., Int. Ed. Engl. 23:895-6 (On Order).

C-W. Tsang, et al., (2002) Organometallics 21:1008-10 (On Order).

A. .F Burchat, et al., (1997) J. Organomet. Chem. 542:281 (On Order).

G. Von Becker, et al., (1981) Z. Anorg. Allg. Chem. 479:41 (On Order).

POLYMERIZATION OF PHOSPHAALKENES

CROSS-REFERENCED TO RELATED APPLICATION(S)

This application is a National Phase Patent Application of International Application Number PCT/CA2003/001982, filed on Dec. 16, 2003, which claims the benefit of the filing date of U.S. Provisional Application No. 60/433,507, filed Dec. 16, 2002.

FIELD OF THE INVENTION

This invention relates to polymers comprising phosphorus and carbon atoms in the polymer backbone.

BACKGROUND OF THE INVENTION

Polymers comprising phosphorus atoms in the polymer backbone are desirable for a variety of applications, including use as polymeric supports for metal catalysts (i.e. Peckham, T. J., et al. (1999) Macromolecules 32:2830-37). Synthetic approaches to the production of such polymers have included ring-opening polymerization (i.e. Peckham, T. J., et al. [supra]; and Kobayashi, S., et al. (1984) Macromolecules 17:107-115), condensation or co-polymerization of aryl phosphines with alkyl radicals and alkylene moieties (i.e. Fox, M. A., et al. (1991) Macromolecules 24:4626; Lucht, B. L. and St. Onge, N. O. (2000) Chem. Commun. 2000:2097-8; Kanazawa, A., et al. (1993) J. of Polymer Science 31:3031-38; and JP6016508). These approaches have resulted in the production of oligomers or polymers of unspecified length comprising phosphine or phosphonium moieties in a chain which otherwise contains aryl groups and/or alkyl or alkene spacers. None of these approaches allow for the production of polymers containing C—P bonds and approximately equimolar amounts of carbon and phosphorus atoms in the polymer backbone.

It has been reported that unstable phosphaalkenes such as methylenephosphine can spontaneously polymerize into unspecified oligomers or polymers (Klebach, T. C., et al. (1978) J. Am. Chem. Soc. 100:4886-8; Pellerin, B., et al. (1987) Tetrahedron Letters 28:5811; Quin, L. D., et al. (1987) Tetrahedron Letters 28:5783-86; Chow, J. R. and Goldwhite, H. (1989) J. Phys. Chem. 93:421-6; and Gaumont, A. C., et al. (1994) J. Chem. Soc. Chem. Commun. 945-6; and Aitken, R. A., et al. (1997) Tetrahedron Letters 38:8417-20). In view of the instability of acyclic compounds containing carbon-phosphorus π bonds, researchers have focused on the development of thermally stable phosphaalkenes, phosphaallenes and phosphaalkynes which have been kinetically stabilized through the presence of bulky substituents on the phosphorus atom (i.e. Gaumont, A. C. and Denis, J. M. (1994) Chem. Rev. 94:1413-39). One of the first such thermally stable phosphaalkene with a localized P=C bond was P-mesityldiphenylmethylenephosphine, the structure of which is shown below in which Ph is phenyl and Mes is 2,4,6-trimethylphenyl (Klebach, T. C., et al. [supra]; Van der Knapp, T. A., et al. (1984) Tetrahedron 40:765-5; and Mundt, O., et al. (1986) Z. Anorg. Allg. Chem. 540/541:319-35).

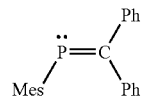

Various thermally stable acyclic phosphaalkenes have been synthesized and reported (i.e. Appel, R. (1990) "Multiple Bonds and Low Coordination in Phosphorus Chemistry", Chapter 4; M. Regits and O. J. Scherer (eds), Thieme; Stuttgart) but there have been no reports of their use in polymerization reactions.

SUMMARY OF THE INVENTION

Previous experiments with thermally stable phosphaalkene Mes*P=CH$_2$ (Mes* is 2,4,6-tri-tert-butylphenyl; (Appel, R., et al. (1984) Angew. Chem., Int. Ed. Engl. 23:895-6) which included treating the phosphaalkene with cationic initiators such as GaCl$_3$, AlCl$_3$, and HOTf showed no signs of polymerization. Rather, treatment with the initiator resulted in intramolecular C—H activation of the Mes* group, which would effectively prevent any chain growth (Tsang, C-W., et al. (2002) Organometallics 21:1008-10).

This invention is based in part on the discovery that acyclic phosphaalkenes, including thermally stabilized species, will undergo addition polymerization to produce regular P(III) containing polymers of significant molecular weight and that initiators other than cationic initiators may be employed to enhance and control the reaction. Furthermore, if isolated or substantially purified thermally stable phosphaalkene monomers are employed, practical yields usually require the use of the initiator, preferably an anionic initiator or a radical initiator. Surprisingly, choice of initiator affects whether the resulting product will consist predominantly of a regular head-to-tail polymer (with alternating phosphorus and carbon atoms in the backbone) or will consist of mixtures of head-to-tail and head-to-head or tail-to-tail species. It has also been discovered that C—P polymers of this invention or monomers from which such polymers are derived may be co-polymerized with non-phosphorus containing monomers (preferably monomers of polyolefins which contain alkene groups) to form random or block co-polymers.

Various embodiments of this invention relate to a polymer comprising one or more units having the formula:

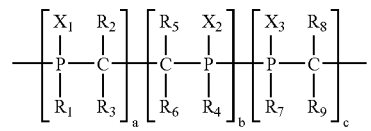

wherein:

each of a, b and c is an integer of zero or more and a+b+c equals at least 3;

each of $X_1$, $X_2$, and $X_3$ are the same or different and is an electron pair, a chalcogen, a halogen, a Lewis acid, a metal ion, an ylide, an alkoxy, an azide, an alkyl or an alky halide;

each of $R_1$, $R_4$, and $R_7$ are the same or different and is a member selected from the group consisting of: a secondary alkyl; a tertiary alkyl; an alkyl substituted with cycloalkyl, trialkylsilyl, aryl or heteroaryl; an aryl; a heteroaryl; a cycloalkyl; and a heterocycloalkyl, wherein the member comprises at least 3 carbon atoms, heteroatoms if present are selected from —O—, —S—, and —N—, said alkyl, cycloalkyl, heterocycloalkyl, aryl and heteroaryl moieties are optionally substituted with halogen and alkoxy, and said aryl, heteroaryl, cycloalkyl and heterocycloalkyl moieties are optionally substituted with alkyl and alkyl halide; and each of $R_2$, $R_3$, $R_5$, $R_6$, $R_8$ and $R_9$ are the same or different and is a member selected from the group consisting of: hydrogen; a primary, secondary, or tertiary alkyl; an alkyl substituted with cycloalkyl, trialkylsilyl, aryl or heteroaryl; an aryl; a heteroaryl; a cycloalkyl; and a heterocycloalkyl; wherein heteroatoms if present, are selected from —O—, —S—, and —N—, said alky, cycloalkyl, heterocycloalkyl, aryl and heteroaryl moieties are optionally substituted with halogen and alkoxy, and said aryl, heteroaryl, cycloalkyl and heterocycloalkyl moieties are optionally substituted with alkyl and alkyl halide.

Various other embodiments of this invention relate to a polymer comprising one or more units having the formula:

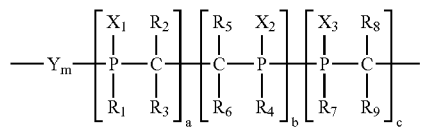

wherein:

each of a, b and c is an integer of zero or more and a+b+c equals at least 1;

each of $X_1$, $X_2$, and $X_3$ are the same or different and is an electron pair, a chalcogen, a halogen, a Lewis acid, a metal ion, an ylide, an alkoxyl, an azide, an alkyl or an alkyl halide;

each of $R_1$, $R_4$, and $R_7$ are the same or different and is a member selected from the group consisting of: a secondary alkyl, a tertiary alkyl; an alkyl substituted with cycloalkyl, trialkylsilyl, aryl or heteroaryl; an aryl; a heteroaryl; a cycloalkyl; and a heterocycloalkyl, wherein the member comprises at least 3 carbon atoms, heteroatoms if present are selected from —O—, —S—, and —N—, said alkyl, cycloalkyl, heterocycloalkyl, aryl and heteroaryl moieties are optionally substituted with halogen or alkoxy, and said aryl, heteroaryl, cycloalkyl and heterocycloalkyl moieties are optionally substituted with alkyl and alkyl halide;

each of $R_2$, $R_3$, $R_5$, $R_6$, $R_8$ and $R_9$ are the same or different and is a member selected from the group consisting of: hydrogen; a primary, secondary, or tertiary alkyl; an alkyl substituted with cycloalkyl, trialkylsilyl, aryl or heteroaryl; an aryl; a heteroaryl; a cycloalkyl; and a heterocycloalkyl, wherein heteroatoms if present are selected from —O—, —S—, and —N—, said alkyl, cycloalkyl, heterocycloalkyl, aryl and heteroaryl moieties are optionally substituted with halogen or alkoxy, and said aryl, heteroaryl, cycloalkyl and heterocycloalkyl moieties are optionally substituted with alkyl and alkyl halide; and Y is a monomer unit of a polyolefin and m is an integer of at least one.

Various other embodiments of this invention relate to a method of making a polymer comprising one or more units of the formula:

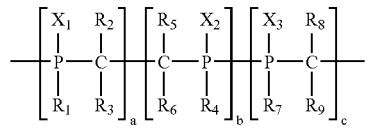

wherein:

each of a, b and c is an integer of zero or more and a+b+c equals at least 2;

each of $X_1$, $X_2$, and $X_3$ is an electron pair;

each of $R_1$, $R_4$, and $R_7$ are the same or different and is a member selected from the group consisting of: a secondary alkyl; a tertiary alkyl; an alkyl substituted with cycloalkyl, trialkylsilyl, aryl or heteroaryl; an aryl; a heteroaryl; a cycloalkyl; and a heterocycloalkyl, wherein the member comprises at least 3 carbon atoms, heteroatoms if present are selected from —O—, —S—, and —N—, said alkyl, cycloalkyl, heterocycloalkyl, aryl and heteroaryl moieties are optionally substituted with halogen or alkoxy, and said aryl, heteroaryl, cycloalkyl and heterocycloalkyl moieties are optionally substituted with alkyl and alkyl halide; and each of $R_2$, $R_3$, $R_5$, $R_6$, $R_8$ and $R_9$ are the same or different and is a member selected from the group consisting of: hydrogen; a primary, secondary, or tertiary alkyl; an alkyl substituted with cycloalkyl, trialkylsilyl, aryl or heteroaryl; an aryl; a heteroaryl; a cycloalkyl; and a heterocycloalkyl, wherein heteroatoms if present are selected from —O—, —S—, and —N—, said alkyl, cycloalkyl, heterocycloalkyl, aryl and heteroaryl moieties are optionally substituted with halogen or alkoxy, and said aryl, heteroaryl, cycloalkyl and heterocycloalkyl moieties are optionally substituted with alkyl and alkyl halide;

wherein the method comprises reacting a plurality of monomers having the formula:

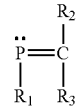

in the presence of an anionic or radical polymerization initiator, wherein the $R_1$, $R_2$, and $R_3$ groups of the monomer are as defined above and may be the same or different in different monomers.

BRIEF DESCRIPTION OF THE DRAWINGS

FIG. 2 compares the $^{31}$P-NMR spectra in CDCl$_3$ of: (a) crude polymerization mixture from thermolysis of compound 1; (b) polymer 2 after purification; (c) poly(methylenephosphine sulfide) 3b; and (d) poly(methylenephospine oxide) 3a.

PDI=1.27); (d) polymer 2 obtained using MeLi initiator ($M_w$=10,300; PDI=1.55); (e) polymer 2 obtained using BuLi initiator ($M_w$=6,000; PDI=1.15); and (f) polymer 2 obtained using VAZO® initiator ($M_w$=6,300; PDI=1.10).

Figure 1:
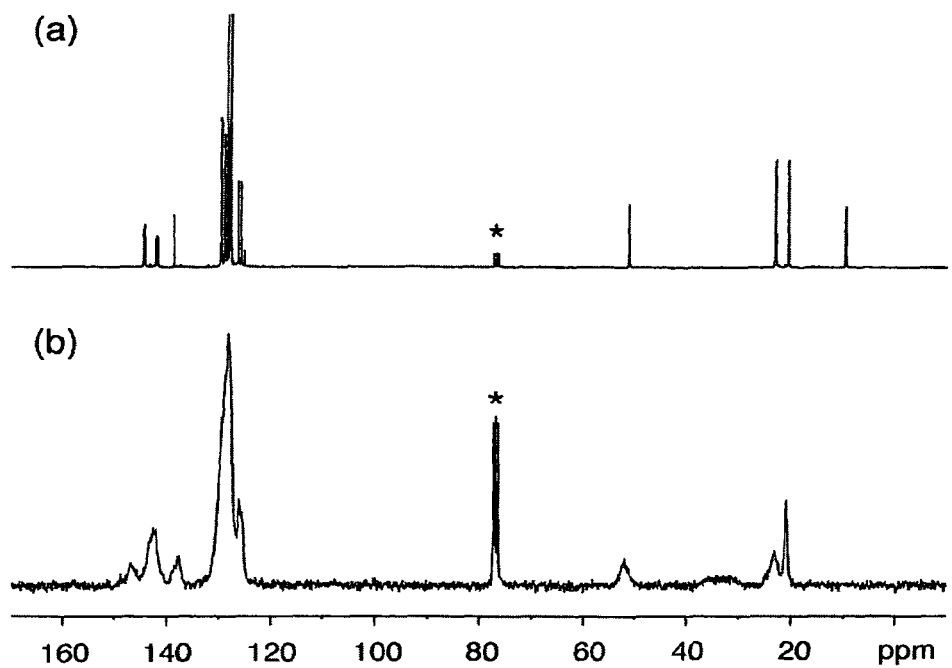
FIG. 1 compares the $^{13}$C-NMR spectra in CDCl$_3$ of: (a) Mes(CH$_3$)PC(Ph)$_2$H, and (b) the poly(methylenephosphine) compound designated 2 herein. The asterix indicates CDCl$_3$.
Figure 3:
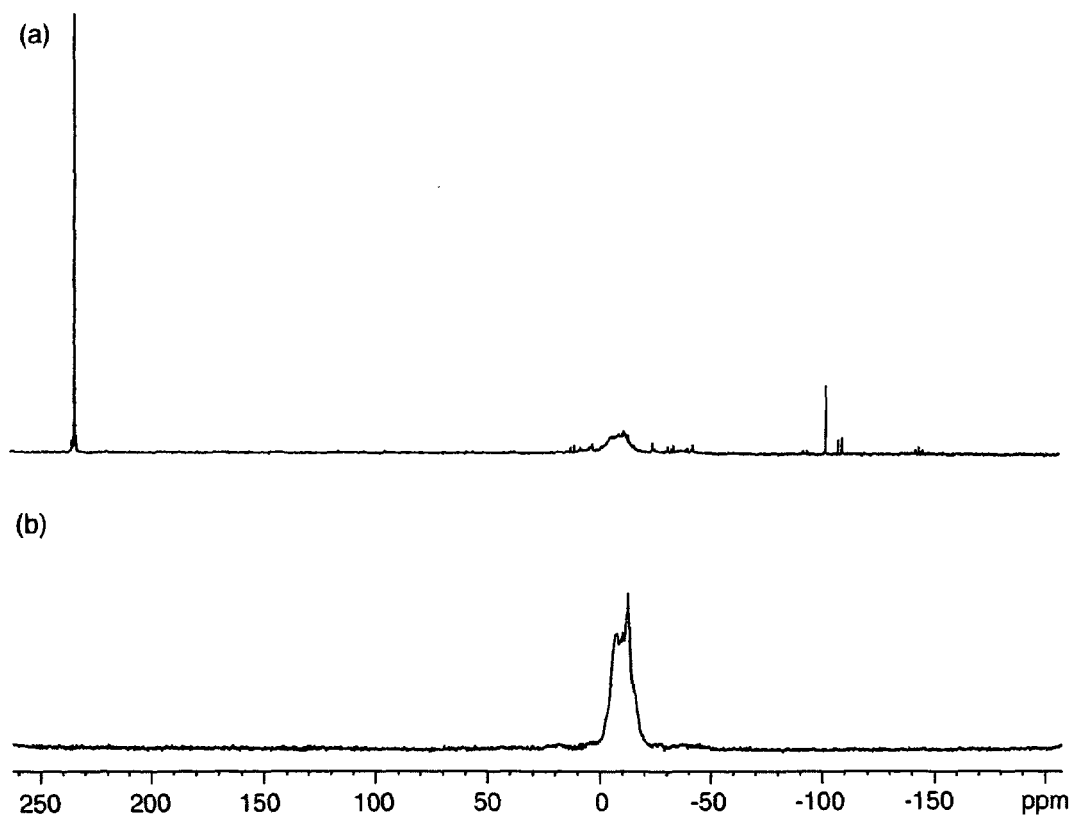
FIG. 3 compares the $^{31}$P-NMR spectra of: (a) crude polymerization mixture (in THF) of compound 1 plus MeLi (5%) before quenching with MeOH; and (b) polymer 2 in CDCl$_3$ after purification.
Figure 2:
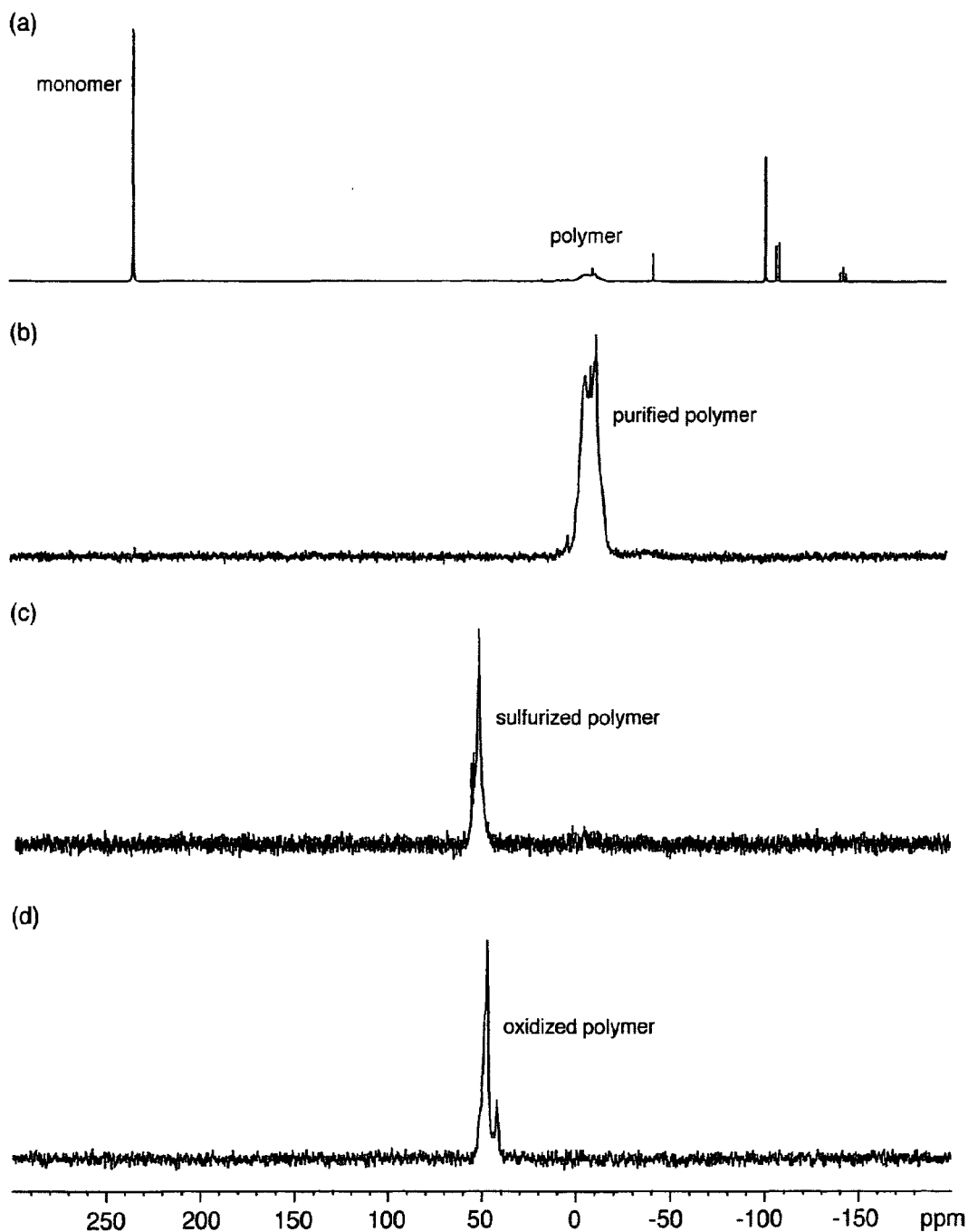
Figure 4:
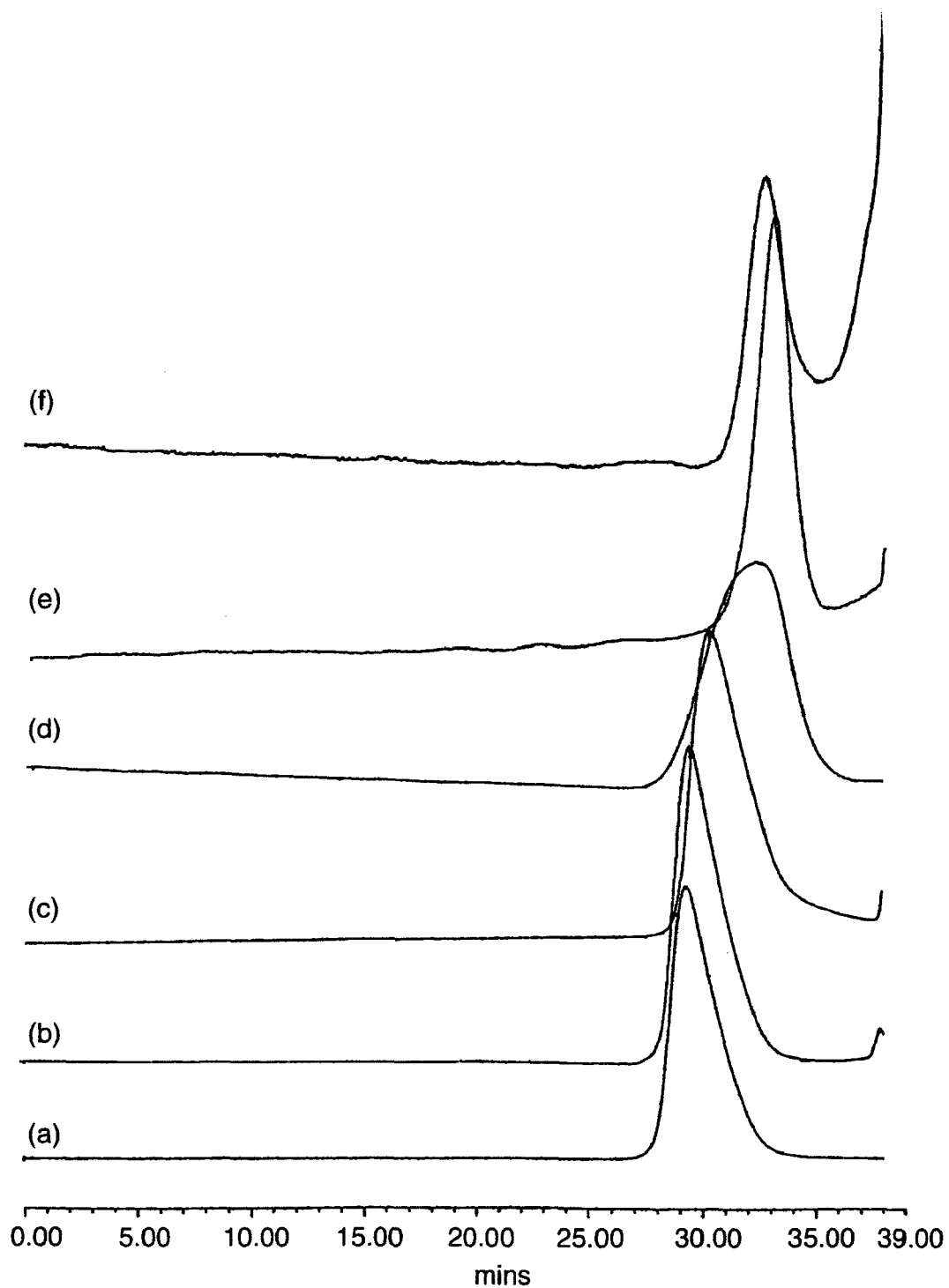
FIG. 4 compares GPC traces (in THF, against polystyrene standards) of: (a) polymer 2 from distillation ($M_w$=14,400; PDI=1.25); (b) 3b derived from 2 above ($M_w$=14,700; PDI=1.24); (c) 3a derived from 2 above ($M_w$=11,200.
Figure 5:
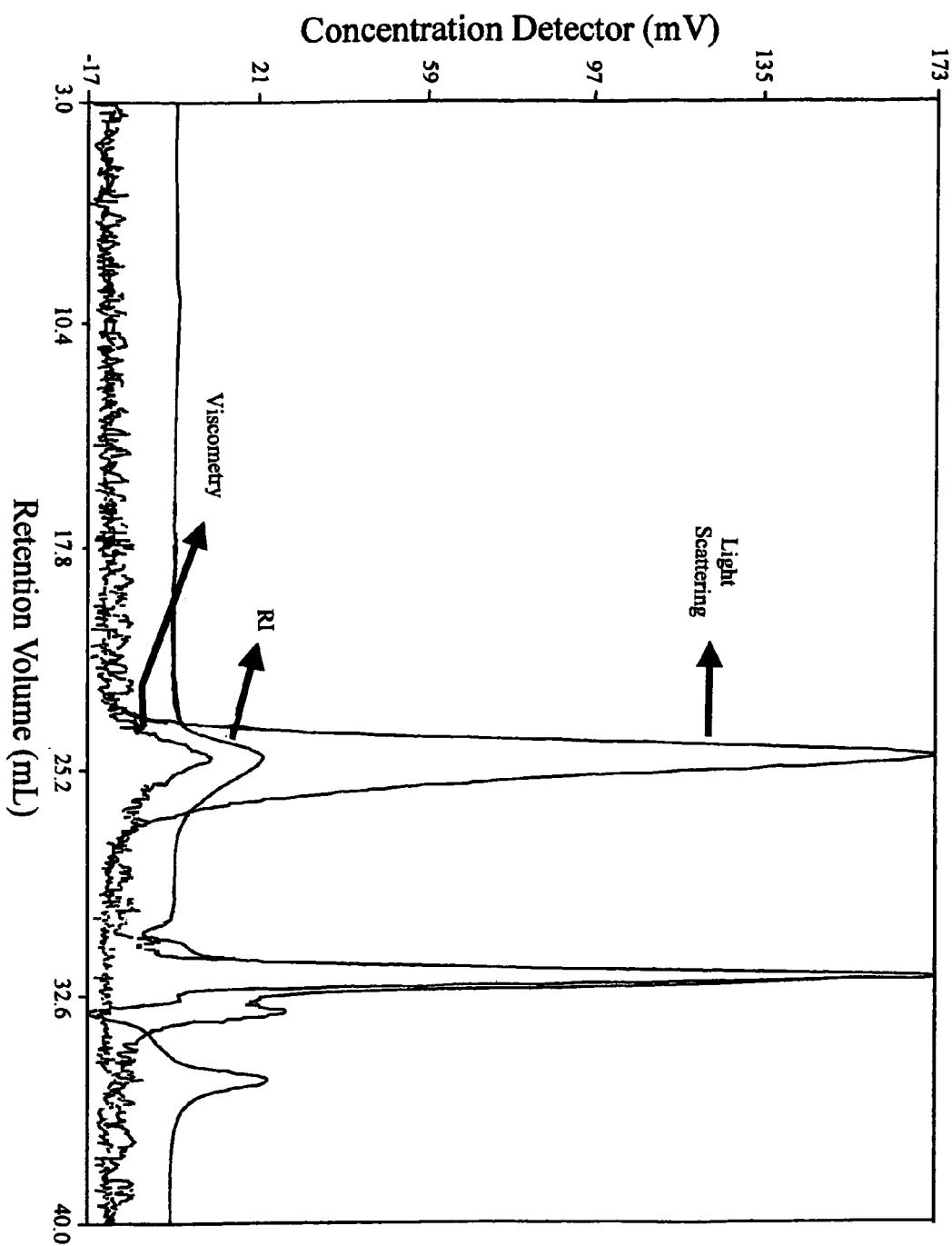

FIG. 5 shows a GPC trace (in THF) using light scattering and viscometry detection of polymer 3b ($M_w$=35,000, PDI=1.08).

Figure 6:
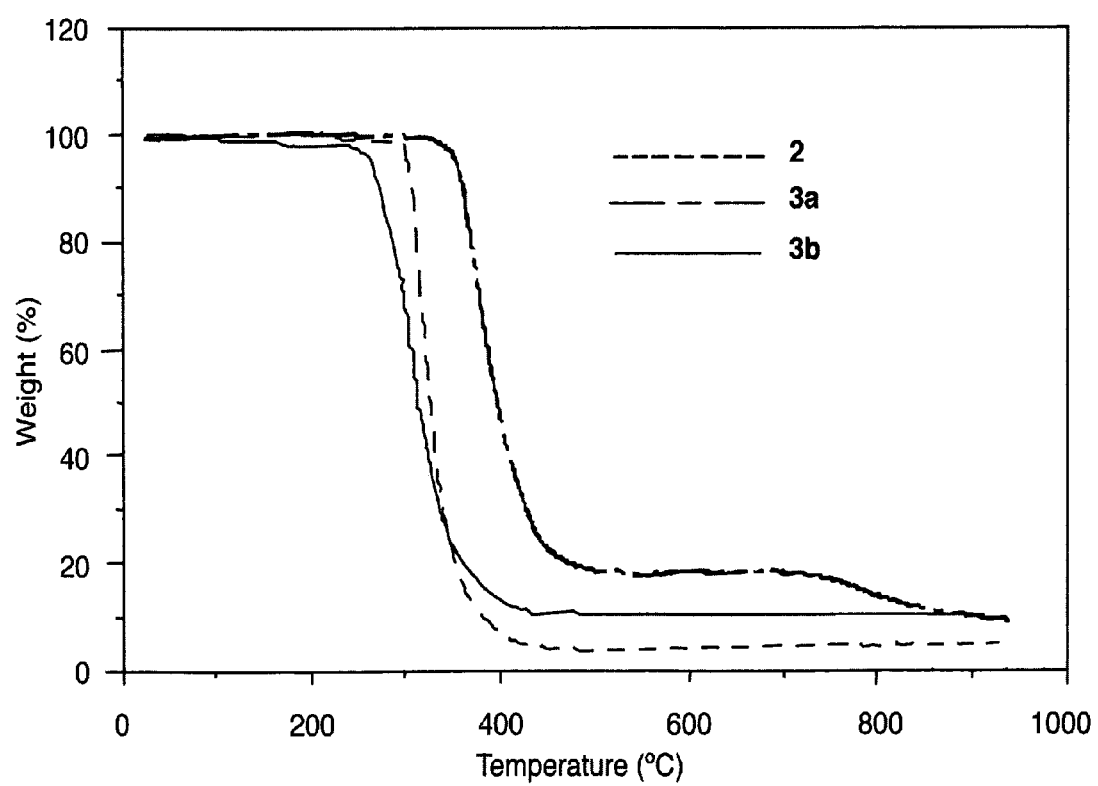

FIG. 6 compares thermogravimetric analysis (TGA) traces of polymers 2, 3a, and 3b.

DETAILED DESCRIPTION OF THE INVENTION

Polymers of this invention comprise one or more units. Such a unit has the formula shown below in which the substituents $X_1$-$X_3$ and $R_1$-$R_9$ and integers a, b, and c are as described above.

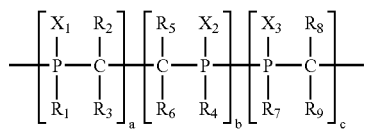

Typically, integers a+b+c will equal a number from 3 to about 10 or more, or about 20 or more, or about 100 or more, or about 1,000 or more, or about 10,000 or more.

Substituents $X_1$-$X_3$ may be an electron pair in polymers immediately formed by the addition polymerization process of this invention, or such substituents may be a moiety joined to the electron pair such as a chalcogen, a halogen, a Lewis acid, a metal ion, an ylide, an alkoxy group, an azide, an alkyl halide or an alkyl group. Examples of chalcogens include oxygen or sulfur atoms or any other two-electron oxidant. Examples of Lewis acids include boranes ($BX_3$ such as $BH_3$) and trivalent aluminum complexes. Examples of metal ions include any such ions which form inorganic coordination complexes such as the transition metals. Many metal atoms and ions found in inorganic coordination compounds and organometallic complexes are Lewis acidic. Thus, the polymers of this invention are able to act as a ligand of varying denticity and may bridge numerous metal atoms. Such metal atoms or ions may be coordinated as well by other ligands, including a parallel or adjacent polymer of this invention. Representative ylides include =$CH_2$. Halogens (e.g. $Cl_2$ or $Br_2$) and halogen sources such as alkyl halides (e.g. $CH_3F$) react with polymers of this invention to form dihalophosphorus (V) containing polymers. Depending upon the nature of groups at $X_1$-$X_3$, polymers of this invention may bear a charge at the phosphorus atom or at Group $X_1$, $X_2$, or $X_3$. In such cases, the polymer may be associated with an appropriate counterion. The Stolinger reaction may be used to form azides at phosphorus atoms in polymers of this invention.

Substituents $R_1$-$R_9$ may be present to stabilize the monomers from which the polymers are formed. The most important groups for stabilization of the monomers are the substituents on the phosphorus atoms, shown above as $R_1$, $R_4$, and $R_7$. Typically, such groups are bulky and sterically hindering. Preferred bulky groups include but are not limited to: $(CH_3)_3$C-(tert-butyl), $(CH_3)_2$HC-(isopropyl)), cyclic ligands such as cyclohexyl, the family of ligands comprising trialkylsilyl compounds such as $((CH_3)_3Si)_n CH_{3-n}$) where n is not zero), and aryl ligands. Preferred substituents for such groups include halogen, alkyl halide (such as —$CH_2Br$ or Cl), alkyl ($C_1$-$C_4$ alkyl) and alkoxy (such as —OMe and —OEt).

Cycloalkyl moieties preferably comprise 4, 5, or 6 or more ring atoms. A preferred heteroatom for heteroaryl moieties is —N—.

Substituents $R_2$, $R_3$, $R_5$, $R_6$, $R_8$ and $R_9$ may comprise less bulky groups but may still be important for stabilization of the monomers. Thus, these substituents may include those listed above for $R_1$, $R_4$, and $R_7$ but in some instances may also be hydrogen or a primary alkyl such as Me or Et. Preferably, such alkyl groups will comprise at least three carbon atoms. These substituents may also be a halogen or an amine group or a hydrocarbyl group.

Preferred substituents for $R_1$-$R_9$ are sterically bulky aryl ligands, particularly those ligands that are substituted at the 2 and/or 6 positions and may be substituted at each of the 2, 4, and 6 positions. Preferred substituents for such groups are Me, Et, tert-butyl groups, alkoxy (e.g. —OMe) and alkyl halide (such as —$CH_2F$).

In a particularly preferred embodiment, $R_1$, $R_4$, or $R_7$ is mesityl and $R_2$, $R_3$, $R_5$, $R_6$, $R_8$ and $R_9$ are aryl groups, particularly phenyl. Polymers of this invention may be isotactic, syndiotactic, or atactic with respect to chiral centres in the polymer. Because phosphorus (III) atoms are stable with respect to inversion of configuration, polymers of this invention will have stereochemical centres at phosphorus (III) atoms.

Polymers of this invention may comprise head-to-tail, head-to-head, or tail-to-tail arrangements as shown below, or mixtures thereof.

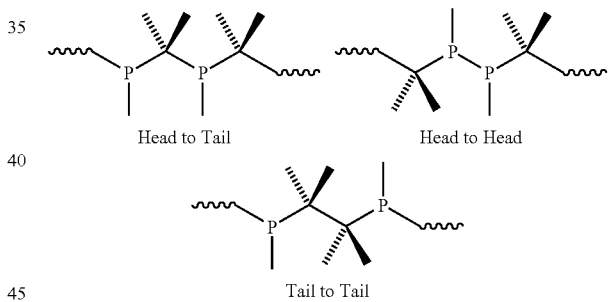

Head to Tail    Head to Head

Tail to Tail

Polymers of this invention, particularly those formed through the use of radical initiators may be branched. There are a number of ways in which such branching may occur in a poly(methylenephosphene) polymer. Some examples of which are shown below. Each of these branching structures may be found in a single branched polymer.

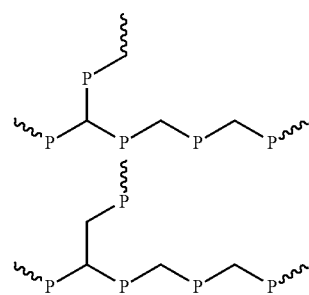

-continued

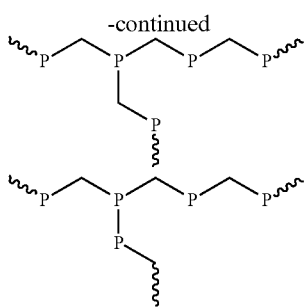

Co-polymers of this invention comprise one or more units having the following formula in which the substituents are as defined above.

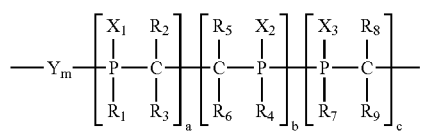

Preferably, monomer units Y are the monomer units of a polyolefin. Such monomer units comprise alykene structures prior to polymerization. Examples include ethene, haloethenes, phenylethenes such as styrene, nitriles such as acrylonitrile and acrylates such as methacrylate, acrylamides, etc.

Co-polymerization of a phosphaalkene monomer with an olefin monomer will reduce the density of phosphorus in polymers of this invention. Such co-polymers may be random or block. Random co-polymers will predominate from mixtures of monomers, particularly if the monomers have similar propagation rates. Block co-polymers will be formed when two different monomers having markedly different propagation rates are employed in a starting mixture or by use of a new monomer grafted to an existing polymer chain. Block co-polymers can be made in a controlled fashion in living polymerization reactions. Once a monomer has been substantially removed from solution, a different monomer can be added, the polymerization of which will be initiated by the living end generated from polymerization of the first monomer. Block co-polymers may also be formed by grafting different oligomers or polymers.

The phosphorus atoms in the chains of polymers of this invention are natural sites of reactivity that can be functionalized, making it possible for the funcationalizing group to act as a site of initiation for polymerization of the same or a different monomer. Alternatively, the phosphorus atom may be used as a site of reactivity on which to graft a pre-formed polymer or oligomer onto the backbone of the polymer chain.

Polymers of this invention will comprise end groups which may be any substituent that can be joined to a polymer or co-polymer of this invention. Typically, one or both end groups will be derived from a radical or anionic initiator and/or a quenching reagent. Such end groups include hydrogen, hydroxyl, an ion such as Li$^+$, substituted or unsubstituted alkyl, alcohol, amine, alkoxy, halogen, etc.

Appropriate choice of initiator and quenching reagent can place reactive functionalities at the end of the polymer chain. An example is the use of lithium amide as an anionic initiator. Quenching with an amine will lead to a polymer kept by amine functionalities. Such a functionality may be modified in order to initiate or graft another polymer or oligomer to the end of the first polymer.

The structures shown below represent polymers and co-polymers of this invention having end groups Z and Z' (which end groups may be the same or different) and in which n is an integer of one or more. Integer n may range as high as 100, 1,000, 3,000 or more.

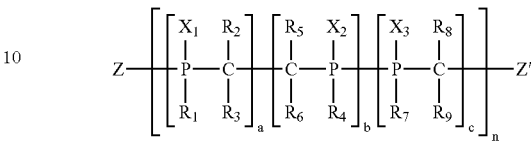

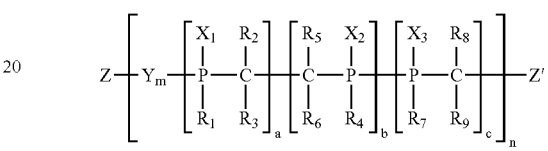

Polymers of this invention are surprisingly regular. While polydispersity indexes of polymers of this invention may be between 1 and about 50, preferably the index is between 1 and about 10, more preferably between 1 and about 5, and even more preferably less than 2. In particularly preferred embodiments, the polydispersity index of the polymer is less than about 1.2 (±0.05).

Polymers of this invention are useful in most applications where phosphines or the derivatives find use. Polymers of this invention are inherently less soluble than their molecular counterparts and are more readily separated from reaction mixtures. Polymers of this invention have an exceptionally high loading of phosphorus atoms in their structure. This lends a very high density of reactive sites to the polymer. These features render polymers of this invention particularly useful for incorporation into or onto films, gels, powders, membranes, beads, microbeads, foams or vessel walls. For example, polymers of this invention are ideally suited for use as catalytic or reactive substrates in reaction vessels, columns, and the like.

An important feature relating to polymers of this invention is the relative ease by which phosphorus (V) containing polymers may be readily reduced to phosphorus (III) polymers by addition of a suitable reducing agent such as $HSiCl_3$, $AlH_3$, and $HAlCl_2$. Other examples include the use of triethylamine to remove borane adducts from the phosphorus atoms. The phosphorus (III) atoms are easily oxidized, readily so with a peroxide.

Other examples of reactions in which polymers of this invention may be employed include the Wittig reaction used in carbon-carbon bond forming. This reaction is between a phosphorus ylide and an aldehyde or ketone which results in substitution of the carbanion carbon atom for a carbonyl oxygen atom. Phosphorus atoms in the polymers of this invention can be readily transformed into ylides by a series of standard organic transformations and then regenerated by a reducing agent such as in the following scheme.

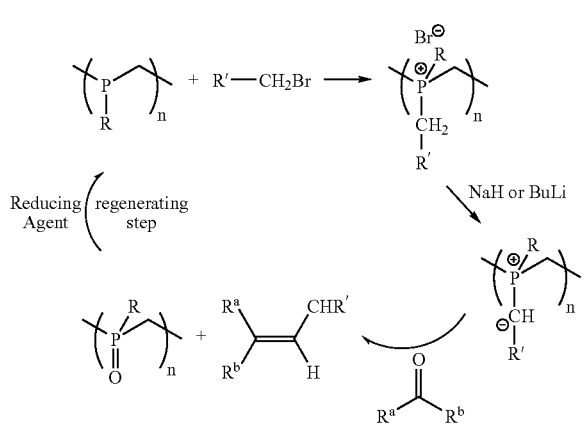

In the general form of a Wittig reaction that has been extended to this invention (as shown above) the phosphorus containing polymer is first reacted with a primary alkyl halide to form a polymeric phosphonium bromide. Subsequent addition of a reagent that supplies anionic alkyl groups or hydride (H') leads to the formation of a polymeric phosphorus ylide. This phosphorus ylide will then react with an aldehyde or ketone to form an olefin and a polymeric phosphine oxide. As discussed above this polymeric phosphine oxide can be readily returned to the polymeric phosphine by addition of a reducing agent, thereby returning the cycle to its starting point.

Another example is the Mitsunobu reaction which performs a stereospecific conversion of an alcohol to another functionality with inversion of configuration. The alcohol is treated with a phosphine, diethylazodicarboxylate, and (usually) a phtalimide, followed by hydrogenolysis. The phosphine reagent may be a polymeric phosphine according to this invention. An example is the scheme described below where hydrazine is used as a nucleophile to create an amine. Other nucleophiles may also be used in the final step.

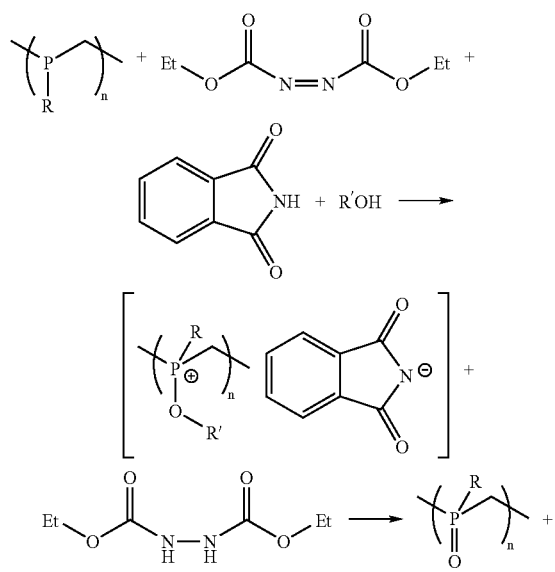

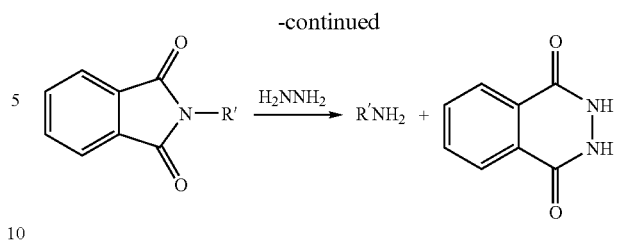

Treatment of thioesters that contain a β-Keto group in the alkyl portion can be converted to β-diketones by treatment with a tertiary phosphine under basic conditions. As shown in the equation below this reaction can also be carried out by the polymeric systems. After separation of the products the polymeric phosphine sulphide that is formed can be returned to the polymeric phosphine by addition of an appropriate reducing agent

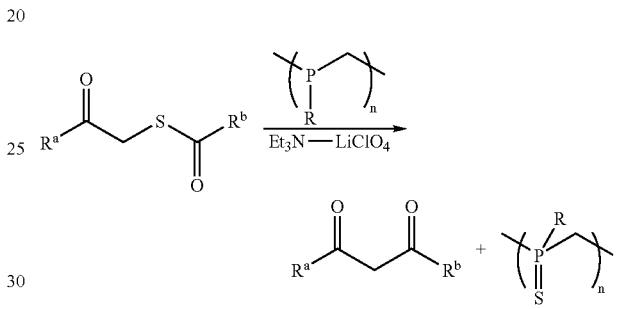

Quaternary salts of nitrogen heterocycles can be dealkylated by the addition of polymeric phosphine, as shown below.

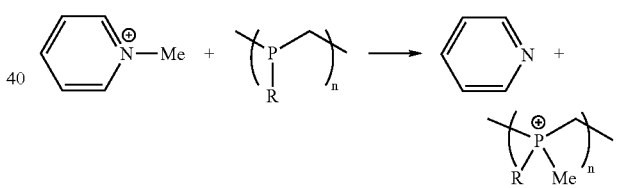

As discussed above, the polymeric phosphines can be converted to dihalophosphorus (V) polymers by the addition of a halogen. The resultant polymers can be used to form aziridines from β-aminoalcohols as shown below.

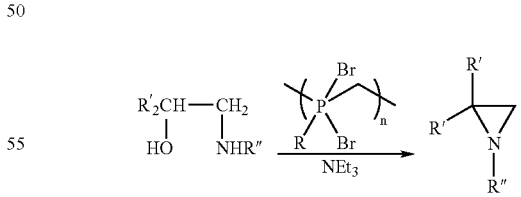

The ability of the phosphorus atoms to coordinate metal atoms/compounds (or other Lewis acids) renders the polymer useful as a metal sequestering material that could be used in environmental clean up and/or contaminant removal from laboratory/industrial chemical samples. Furthermore, the structurally elaborated polymers described above such as poly(methylenephosphineoxide) and poly(methylenephosphinesulfide) could also be used in a similar way because the oxygen and sulfur atoms present in their structures are capable of coordinating metals (or other Lewis acids). In particular the poly(methylenephosphinesulphide) polymers may prove ideal for coordination and sequestering of heavy metals such as mercury or cadmium and compounds thereof. Numerous, industrially and synthetically important catalytic processes rely on catalysts that are comprised of metal atoms (typically transition metals) that are coordinated by phosphorus containing ligands. As discussed above, the phosphorus containing polymers described herein readily coordinate metal atoms, they are therefore ideally designed to act as ligands in homogeneous and heterogenous catalysis. An important example of a phosphine containing catalyst is Wilknson's Catalyst for the hydrogenation of olefins.

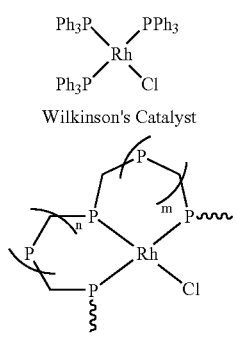

Wilkinson's Catalyst

Polymer Supported Wilkinson's Catalyst n, m are greater than or equal to zero. Also, the coordinated phosphine groups may not all belong to the same polymer chain Polymer supported catalysts such as those described above should be advantageous because they will have lower solubility than their non-polymeric analogues. Decreasing solubility to the point of insolubility allows easy recovery of the catalyst material from the reaction mixture, this is particularly important for catalytic processes that utilize expensive metals. Co-polymers of phosphaalkene monomers and non-phosphorus containing monomers may also be used in this application.

Typical preceramic polymers are composed of a chain of main-group inorganic elements with organic appendages. When heated to sufficient temperature, the organic appendages are shed to leave an amorphous network of inorganic elements. Subsequent heat treatment transforms this material into crystalline ceramic. The P—C backbone polymers that are the subject of this application will behave as preceramic polymers upon sufficient heating. The ease of fabrication of polymer chains of different composition, i.e. varying the chemical structure of the preceramic polymer by functionalization with, for example, oxygen or coordinated metals will allow us to tailor the properties of the final ceramic formed upon heating.

Phosphorus containing materials have been widely used as flame retardants in polymeric systems. It is also useful to bond flame retardant groups to polymeric backbones to provide reactive-type flame retardants. Consequently, a smaller amount of flame retardant is required in the polymeric system. Polymers of this invention will have use in flame retardant systems.

Polymers of this invention and their derivatives may be biocompatible for forms which biodegrade to tolerable phosphates. It is therefore envisioned that suitable polymers of this invention may be used in drug delivery systems.

Phosphaalkene monomers for use in the polymerization method of this invention are preferably "thermally stable" monomers. For purposes of this specification, such monomers are defined as being capable of purification by distillation (with or without vacuum) with a loss of no more than 50% of the starting material to decomposition, oligomerization, or uncontrolled polymerization reactions. However, in view of the discovery provided by this invention of the advantage in using anionic and radical initiators, the method of this invention may be employed for polymerization of relatively unstable phosphaalkene monomers under the right conditions. While heating or application of incident electromagnetic radiation of the monomer (either pure or in solution) may be enough to overcome kinetic stabilization and initiate polymerization, practical yields and controlled reactions will often dictate the use of an anionic or radical initiator as taught herein.

As is shown in the Examples below, heating of an impure, thermally stable phosphaalkene monomer 1 resulted in some production of polymer 2. However, heating of the same monomer in an isolated form at 150° C. did not result in polymerization. In a parallel situation, heating of Mes*P=CH$_2$ (0.51 g; 1.75 mmole) in a sealed tube at 180° C. for 18 hours followed by dissolution in THF and precipitation (×3) with CH$_3$CN and washing with CH$_3$CN resulted in a solid (yield 0.20 g, (40%); M$_w$=1200).

Monomers for use in this invention are preferably ones which may be isolated at workable synthetic temperatures (i.e. about −100° C. to about 50° C.). More preferably, such monomers should be capable of isolation at ambient or refrigerator temperatures (i.e. about −5° C. to about 30° C.).

Various procedures may be employed to store and/or stabilize monomers prior to use. Many of the monomers are stable in solid form. Monomers with minimal kinetic stabilization may be stabilized by addition of a separate stabilization agent such as those used for other monomers. These include radical scavengers such as BHT and other substances that scavenge basic contaminants. Monomers may also be stabilized, for example for storage, by addition of a Lewis base that will coordinate the phosphorus atom of the phosphaalkene. The stabilizing Lewis acid adduct may be removed when necessary by the addition of a Lewis base to the system.

Solvents for use in the polymerization reaction of this invention may be selected by the person of skill in the art appropriate for the reactants. Representative solvents include THF, CH$_2$Cl$_2$, etc. Polymerization may also be carried out using solid components, typically with heating. Preferably, polymerization reactions of this invention are conducted below 200° C., more preferably at about or below 180° C. or 150° C., and even more preferably at about or below 100° C. Polymerization reactions that can be carried out at about room temperature (about 30° C. or less) are particularly preferred. Lower temperatures may require a longer period of polymerization.

Use of isolated or substantially pure monomers is preferred. In such cases, practical yields will often require the use of an initiator in the polymerization reaction of this invention. Use of an initiator is also desirable for control and/or acceleration of the process. Within this specification, the terms "isolated", "isolate", "isolating" and "substantially pure" refer to situations where the monomer or polymer is isolated or purified to the extent that it represents at least 50% by weight of the composition in which the monomer or polymer is present. Preferably, the latter figure will be at least 60%, more preferably 70%, even more preferably 80% and most preferably about 90% or more. In the most preferred embodiments, isolation or purification will result in greater than about 95% purity. The multiple precipitation steps described in the Examples below resulted in much greater purity levels.

Polymers of this invention may be isolated or purified through suitable known methodologies including fractionation with different solvents, precipitation from different solvents, and chromatographic methodologies. In a typical embodiment, the polymer is synthesized in a solvent and precipitated by the addition of a different precipitating solvent. For example, the polymer may be synthesized in tetrahydrofuran (THF) with the precipitating solvent being an alcohol such as methanol, an alkane such as hexane, or water or mixtures thereof. Preferably, such precipitation is repeated. Precipitated polymer may be re-dissolved in a different solvent (i.e. a halogenated solvent such as dichloromethane) and re-precipitated by the addition of a precipitating solvent such as that described above.

Use of anionic initiators tends to result in the production of very regular head-to-tail polymer arrangements, which contain alternating P and C atoms in the polymer backbone. Various suitable strong bases may be used as such an initiator. Common examples include alkyl and aryl lithium compounds such as methyl lithium (MeLi), butyl lithium (e.g. t- or n-BuLi). Bifunctional anionic initiators may be employed.

Use of radical polymerization initiators in the process of this invention tends to result in the production of mixed polymer arrangements. For example, the resulting polymers may comprise a mixture of head-to-tail and head-to-head arrangements. Such polymers will exhibit different properties than those with consistent alternating C and P atoms. A person of skill in the art may select appropriate radicals for use in initiating polymerization reactions of this invention. Azo compounds such as that employed in the Examples below are particularly useful. Other suitable radicals include peroxides and alkoxy radicals.

Termination of anionic or radical initiated polymerizations may be conducted by known means such as the addition of quenching agents or radical trapping or scavenging agents. For example, water or an alcohol such as methanol may suitably be used for quenching alkyl lithium initiated polymerization reactions as shown in the Examples below.

Various individual embodiments of the invention will be described more particularly in the Examples below.

EXAMPLES

General Procedures

All manipulations of air and/or water sensitive compounds were performed under prepurified nitrogen (Praxair, 99.998%) using standard high vacuum or Schlenk techniques or in an Innovative Technology Inc. glovebox. $^1$H, $^{31}$P, and $^{13}$C, NMR spectra were recorded at room temperature on a Bruker Avance 300 MHz spectrometer. Chemical shifts are reported relative to: CHCl$_3$ ($\delta$=7.24 for $^1$H); 85% H$_3$PO$_4$ as an external standard ($\delta$=0.0 for $^{31}$P); CDCl$_3$ ($\delta$=77.0 for $^{13}$C). Mass Spectra were acquired using a Kratos MS 50 instrument. Molecular weights were estimated by gel permeation chromatography (GPC) using a Waters liquid chromatograph equipped with a Waters 515 HPLC pump, Waters 717 plus autosampler, Waters Styragel® columns (4.6×300 mm) HR2, HR4 and HR5E and a Waters 2410 differential refractometer (refractive index detector). A flow rate of 0.3 ml/min was used and samples were dissolved in THF (ca. 1 mg/ml) and filtered before injection. Narrow molecular weight polystyrene standards were used for calibration purposes. Thermogravimetric analyses (TGA) were carried out on a TA Instruments 2000 instrument with a TGA5 1 module, heating under dry nitrogen at 10° C./min from 20° C. to 800° C. or 950° C. GPCLLS of 3b was performed using a Waters Associates 2690 separation module equipped with a Waters 410 differential refractometer and a Viscotek T6OA dual detector connected in parallel. The refractive index increment (dn/dc) of the polymer solutions was obtained with a Chromatix KMX-16 differential refractometer operating at a wavelength of 632.8 mL The instrument was calibrated with NaCl solutions.

Materials

Hexanes, and dichloromethane were dried by passing through activated alumina columns. Tetrahydrofuran was distilled from sodium/benzophenone immediately prior to use. MeOH and deionized water were degassed prior to use. CDCl$_3$ (CIL) was distilled from P$_2$O$_5$ and degassed. Benzophenone, sulfur and H$_2$O$_2$ (30% in H$_2$O) were purchased from Aldrich and sublimed prior to use. KOH was purified by recrystallization from ethanol and heating following the procedure for NAOH in Armarego, W. L. F. and Perrin, D. D. "Purification of Laboratory Chemicals" (4ed) Butterworth Heinemann Press, p. 429). VAZO® [1,1'-Azobis(cyclohexanecarbonitrile)] was purchased from Alrich and used as received. MeLi (1.12 M in diethyl ether), and ρ-BuLi (1.44 M in hexane) were purchased from Aldrich and were titrated prior to use to give the above concentrations (Burchat, A. F., et al. (1997) J. Organomet. Chem. 542:281). MesP(SiMe$_3$)$_2$ was prepared following the procedure of Becker, Von G., et al. (1981) Z. Anorg. Allg. Chem. 479:41.

Preparation of mesityl(diphenylmethylene)phosphine (1)

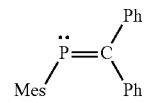

1

(a) Preparation of crude 1: The procedure was adapted from Mundt, O., et al., [supra]. To a stirred solution of mesitylbis(trimethylsilyl)phosphine (20.0 g, 0.067 mol) and benzophenone (12.3 g, 0.067 mol) in THF (300 ml) was added a suspension of finely ground anhydrous KOH (0.38 g, 6.77 mmol) in THF (40 ml). The pale yellow reaction mixture was stirred for 1 hour and an aliquot was removed and analyzed by $^{31}$P NMR. The spectrum obtained suggested quantitative formation of phosphaalkene ($\delta$=234 ppm). The solvent was removed in vacuo and subsequently, hexanes was added to extract the product 1. After filtration and solvent removal in vacuo, ca. 18 g (85%) of crude 1 was obtained as a yellow oil.

(b) Purification of 1 by distillation: The crude 1 (18 g) was transferred to a short-path distillation apparatus and was heated under vacuum in an oil bath (200° C., 0.01 mm Hg). The refluxing yellow liquid distilled at 150-160° C. over a 3 h period leaving a gummy pale brown residue. The distallate was collected in a Schlenk flask and was recrystallized from a minimum amount of cyclohexane (×3) at room temperature. Yield of 1:12.0 g (67%).

$^{31}$P NMR (CDCl$_3$): $\delta$ 234; $^1$H NMR (CDCl$_3$): $\delta$ 7.52-6.87 (m, 10H, aryl H), 6.70 (s, 2H, Mes H), 2.27 (s, 6H, o-CH$_3$), 2.20 (s, 3H, p-CH$_3$). Anal. Calcd. for C$_{22}$H$_{21}$P:C, 83.52; H, 6.69. Found: C, 83.42; H, 6.74.

(c) Characterization of distillation residue: The gummy pale brown residue from the distillation [part (b)] was dissolved in CH$_2$Cl$_2$ and $^{31}$P NMR spectroscopic analysis of the solution showed the presence of 1 and several sharp resonances and a broad signal at −10 ppm. Addition of a concentrated solution of the residue to rigorously stirred hexanes (ca. 100 ml) resulted in the precipitation of a fibrous material which was precipitated four times from a concentrated THF solution with hexanes. The solid was dried in vacuo overnight. Yield=1.20 g (7%). The $^1$H and $^{13}$C NMR spectra exhibited signals consistent with structure 2. However, reacting monomers of compound 1 purified by distillation (as above) at 150° C., does not result in production of 2.

$^{31}$P NMR (CDCl$_3$): δ-10 (br); $^1$H NMR (CDCl$_3$): δ 7.8-6.6 (br, 12H, aryl H), 2.5-1.9 (br, 9H, p-CH$_3$, o-CH$_3$); $^{13}$C NMR (CDCl$_3$): δ 146.7 (br, Mes-C), 143.2 (br, Mes-C), 138.0 (br, Mes-C), 132-125 (br mult, Ph-C), 52.2 (br, P—C—P), 23.1 (br, o-CH$_3$), 21.0 (br, p-CH$_3$); GPC (THF, vs. polystyrene): M$_n$=11,500 g·mol$^{-1}$, M$_w$=14,400 g·mol$^{-1}$, PDI (M$_w$/M$_m$)= 1.25; Anal. Calcd. for (C$_{22}$H$_{21}$P)$_n$: C, 83.52; H, 6.69. Found: C, 82.0; H, 6.53.

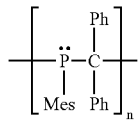

2

Polymerization of 1 Using VAZO® (Radical Initiator)

A pyrex tube was charged with 1 (1.00 g, 3.16 mmol) and VAZO® (0.08 g, 0.32 mmol) and the tube was flame sealed in vacuo. The mixture was heated (200° C., 48 h) in an oven equipped with a rocking tray over which time the reaction became increasingly viscous. $^{31}$P NMR analysis of the product in THF showed that approximately half the monomer 1 was consumed and several new broad resonances were observed. The molecular impurities were removed by repeated precipitation of concentrated THF solutions with hexanes (×6). Yield=0.16 g (16%). The $^{31}$P NMR spectrum of the isolated polymer 2 shows very broad overlapping signals with maximum at −10 and −40 ppm. This indicates the presence of head-to-tail and head-to-head enchainments unlike that obtained with the distillation residue above or the polymer prepared within an anionic initiator as described below.

$^{31}$P NMR (CDCl$_3$): δ−10.0 br mult), −40.3 br) ppm; GPC (THF, vs. polystyrene): M$_n$=5,700 g·mol$^{-1}$, M$_w$=6,300 g·mol$^{-1}$, PDI=1.10.

Polymerization of 1 Using MeLi (0.05 Equivalent):

To a pyrex tube containing 1 (1.00 g, 3.16 mmol) and a small amount of THF (ca. 0.2 ml) was added MeLi (1.12 M, 0.14 ml, 0.16 mmol). The contents of the tube were immediately frozen (liquid nitrogen) and the tube was flame sealed in vacuo. The tube was heated (150° C., 24 h) in an oven equipped with a rocking tray. The reaction mixture became increasingly viscous over the 24 h period. The product was dissolved in THF (ca. 30 mL) and quenched with degassed MeOH (ca. 0.1 ml). The sample was concentrated in vacuo (ca. 1 ml), and degassed water (30 ml) was added to precipitate the polymer. The polymer was precipitated from THF with MeOH (×1) and hexanes (×1). The pale yellow solid was further washed with hexanes and isolated by filtration and dried in vacuo. Yield=0.30 g (20%). This experiment was repeated several times and identical spectroscopic data were obtained and the polymers had M$_w$'s in the range 5,000-10000 g·mol$^{-1}$ were obtained.

GPC (THF, vs. polystyrene):M$_n$=6,600 g·mol$^{-1}$, M$_w$=10,300 g·mol$^{-1}$, PDI=1.55. The $^{31}$P, $^1$H and $^{13}$C NMR spectra were identical to that for polymer 2 obtained from the distillation residue above.

Polymerization of 1 Using BuLi (0.05 Equivalent):

To a pyrex tube containing 1 (1.00 g, 3.16 mmol) was added BuLi (1.44 M, 0.11 ml, 0.16 mmol). The contents of the tube were immediately frozen (liquid nitrogen) and the tube was flame sealed in vacuo. The tube was heated (150° C., 24 h) in an oven equipped with a rocking tray. The reaction mixture became increasingly viscous over the 24 h period. The product was dissolved in minimal amount of THF (ca. 2 ml) and precipitated with degassed MeOH (30 ml) and isolated by filtration. The polymer was reprecipitated from a minimal amount of CH$_2$Cl$_2$ (ca. 1 ml) with 30 ml hexanes (×3). The pale yellow polymer was isolated by filtration and dried in vacuo. Yield=0.25 g (25%).

GPC (THF, vs. polystyrene):M$_n$=5,400 g·mol$^{-1}$, M$_w$=6, 200 g·mol$^{-1}$, PDI=1.15. The $^{31}$P NMR spectrum was identical to those for polymer 2 obtained from the distillation residue or using MeLi (above).

Reaction of 1 with MeLi (1 Equivalent):

To a cooled (−80° C.) stirred solution of 1 (1.07 g, 3.38 mmol) in diethyl ether (20 ml) was added dropwise MeLi (1.05 M, 3.9 ml, 4.1 mmol). The reaction mixture changed color from brown to red and finally to orange over 30 min and the cooling bath was removed. Upon warming to room temperature, degassed water (10 ml) was added to the reaction mixture and the solution became a pale yellow color. The ether portion was separated from the aqueous layer and dried with MgSO$_4$. The solvent was removed in vacuo leaving a yellow oil which solidified over several days. The product 4 was recrystallized from a minimum amount of hexanes to give colorless crystals. Yield=0.92 g (82%).

$^{31}$P NMR (CDCl$_3$): δ-24.6 ppm; $^1$H NMR (CDCl$_3$): δ 7.60-7.58 (d, 2H, aryl H), 7.35-7.00 (m, 8H, aryl H), 6.75 (s, 2H, Mes H), 4.88 (d, 1H, —C(H)Ph$_2$, $^2$J$_{PH}$=5.30 Hz), 2.51 (s, 6H, o-CH$_3$), 2.16 (s, 3H, p-CH$_3$); $^{13}$C NMR (CDCl$_3$): δ 144.4 (m, Mes-C), 144.2 (m, Mes-C), 138.6 (s, Mes-C), 129.5-125.8 (m, Ph-C), 125.80 (d, Mes-C, $^4$J$_{PC}$=1.28 Hz), 51.30 (d, MesP(CH$_3$)C(H)Ph$_2$, $^1$J$_{PC}$=16 Hz), 23.20 (d, o-CH$_3$, $^4$J$_{PC}$=18.34 Hz), 20.70 (s, p-CH$_3$), 9.84 (d, MesP (CH$_3$)—C(H)Ph$_2$, $^4$J$_{PC}$=18.72 Hz); MS (EI, 70 eV): m/z (%): 333 (4), 332 (15) [M], 168 (15), 167 (100) [C(H)Ph$_2$]$^+$. Anal. Calcd. for (C$_{23}$H$_{25}$P)$_n$: C, 83.10; H, 7.58. Found: C, 82.78; H, 7.46.

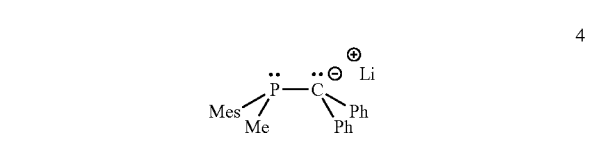

4

Reaction of 1 with Compound 4:

Monomer 1 polymerizes in the presence of 4 (0.05 equivalent; 24 hours; 150° C.) to yield polymer 2 (39%; M$_n$=6200; PDI=1.29).

Preparation of poly(methylenephosphine oxide) 3a

Compound 2 is reasonably air and moisture stable in the solid state. However, it will slowly form phospine oxide 3a in CH$_2$Cl$_2$ solution when exposed to air for 4 days. To a solution of polymer 2 (0.16 g, 0.51 mmol, M$_w$=15,000 g·mol$^{-1}$) in CH$_2$Cl$_2$ (5 ml) was added 30% H$_2$O$_2$ in water (3 ml). The reaction mixture was stirred rigorously and shaken for 3 hours. Analysis of the reaction mixture by $^{31}$P NMR showed quantitative formation of a new product with a broad signal at 47 ppm. The aqueous layer was removed and the CH$_2$Cl$_2$ layer was extracted with H$_2$O three times in air. The organic layer was dried with MgSO$_4$ and the solvent removed in vacuo leaving a colorless solid. The polymer 3a was purified by precipitation of a concentrated THF solution with hexanes and dried in vacuo. Yield=0.10 g (60%). Polymer 3a is air and moisture stable.

$^{31}$P NMR (CDCl$_3$): δ 47 (br); $^1$H NMR (CDCl$_3$): δ 7.8-6.6 (br, 12H, aryl H), 2.5-1.9 (br, 9H, p-CH$_3$, o-CH$_3$); GPC (THF, vs. polystyrene): M$_n$=8,800 g·mol$^{-1}$, M$_w$=11,200 g·mol$^{-1}$, PDI=1.27.

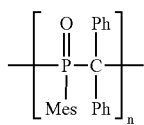

3a

Preparation of poly(methylenephosphine sulfide) 3b

A solution of polymer 2 (0.30 g, 0.95 mmol) in CH$_2$Cl$_2$ (20 ml) was added to a suspension of S$_8$ (0.15 g, 0.58 mmol) in CH$_2$Cl$_2$ (10 ml). The stirred suspension was monitored by $^{31}$P NMR spectroscopy and after 48 h the quantitative formation of a new product (δ=52 ppm) was observed The excess sulfur was removed by filtration and subsequent sublimation of the solid (80° C., 0.01 mm Hg). The polymer 3b was precipitated from a concentrated CH$_2$Cl$_2$ solution with hexane. The polymer was obtained as a solid. Yield=0.27 g (84%).

$^{31}$P NMR (CDCl$_3$): δ 52 ppm (br); $^1$H NMR (CDCl$_3$): δ 7.8-6.6 (br, 12H, aryl H), 2.5-1.9 (br, 9H, p-CH$_3$, o-CH$_3$); $^{13}$C NMR (CDCl$_3$): δ 146.6 (br, Mes-C), 142.4 (br, Mes-C), 137.7 (br, Mes-C), 132-124 (br mult, Ph-C), 52.2 (br, P—C—P), 23.1 (br, o-CH$_3$), 20.8 (br, p-CH$_3$); GPC (THF, vs. polystyrene):M$_n$=11,900 g·mol$^{-1}$, M$_w$=14,700 g·mol$^{-1}$, PDI=1.24; GPC-LLS (THF): M$_n$=32,000 g·mol$^{-1}$, M$_w$=35,000 g·mol$^{-1}$, PDI=1.08, dn/dc=0.152 ml/g, Rgw=4.27 nm, Rhw=3.27 nm; Anal. Calcd. for (C$_{22}$H$_{21}$PS)$_n$: C, 75.80; H, 6.10. Found: C, 72.20; H, 6.19.

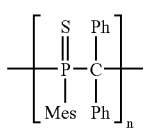

3b

Preparation of poly(methylenephosphine borane)

To a solution of poly(methylenephosphine) (0.13 g, 0.41 mmol, M$_w$=14,400 g·mol$^{-1}$) in THF (10 ml) was added BH$_3$.THF (1.0 M, 2.05 ml, 2.05 mmol). The reaction mixture was stirred and shaken for 3 hours. Analysis of the reaction mixture by $^{31}$P NMR showed quantitative formation of a new product with a broad signal at 27 ppm. The solvent was removed in vacuo and the product was extracted three times with hexanes. The solvent was evacuated to give a white solid. Yield=0.12 g (88%).

$^{31}$P NMR (CDCl$_3$): 27 (br); GPC (THF, vs. polystyrene): M$_w$=15,000, PDI=1.27.

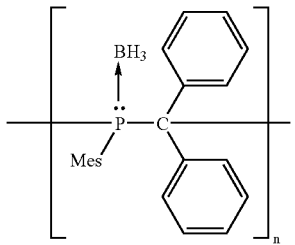

Synthesis of methyl phosphonium triflate Polymer (i.e. methylated polymer)

To a solution of poly(methylenephosphine) (0.2 g, 0.63 mmol) in CH$_2$Cl$_2$ (ca. 20 ml) was added CH$_3$SO$_3$CF$_3$ (0.104 g, 0.63 mmol) dropwise. The product was dissolved in a min. amount of CH$_2$Cl$_2$ (ca. 2 ml) and precipitated (×5) with hexanes (ca. 30 ml). Yield: 0.146 g (73%).

$^{31}$P NMR (CD$_2$Cl$_2$): δ=29 (br, Me-P, ca. 50%), −10 (br, unmethylated, ca. 50%).

Preparation of poly(mesityl bis(4,4'-difluoro)phenyl phosphine)

To a pyrex tube containing bis((4,4'-difluoro)phenyl)-methylene mesityl phosphine (0.5 g, 1.4 mmol) was added MeLi (1.4 M, 0.1 ml, 0.14 mmol). The tube was flame sealed in vacuo and heated (150° C., 24 h) in an oven equipped with a rocking tray. The reaction mixture became increasingly viscous over the 24 h period. The polymerization was quenched with MeOH and the polymer was precipitated from THF with water (×1) and hexanes (×3). The isolated polymer was then oxidized with H$_2$O$_2$ and then dried. Yield=0.30 g (30%). This experiment was repeated without any solvent added to the tube and identical spectroscopic data were obtained and the polymers had molecular weights in the range 5,000-9,000 g·mol$^{-1}$ were obtained.

$^{31}$P NMR (CDCl$_3$, 300 K): δ-12 (br), after oxidation: δ 43 (br). $^{19}$F NMR (CDCl$_3$, 300 K): δ-117 (br), after oxidation: δ-117 (br).

GPC (THF, vs. polystyrene): M$_w$=6,200, PDI=1.24.

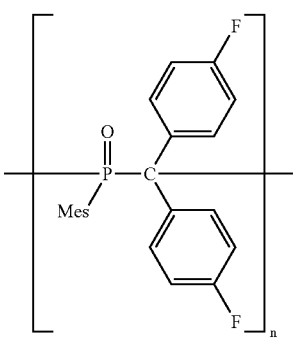

Preparation of poly(mesityl(4-fluoro)phenyl phosphine)

To a pyrex tube containing di(4-fluoro)phenyl-methylene mesityl phosphine (0.5 g, 1.5 mmol) was added MeLi (1.6 M, 0.05 ml, 0.07 mmol). The tube was flame sealed in vacuo and heated (150° C., 24 h) in an oven equipped with a rocking tray. The reaction mixture became increasingly viscous over the 24 h period. The polymerization was quenched with MeOH and the polymer was precipitated from THF with water (×1) and hexanes (×3). The isolated polymer was then oxidized by $H_2O$ and then dried. Yield=0.14 g (28%).

$^{31}P$ NMR ($CDCl_3$, 300 K): δ-12.7 (br), after oxidation: δ 44 (br). $^{19}F$ NMR ($CDCl_3$, 300 K): δ-117 (br), after oxidation: δ-117 (br). GPC (THF, vs. polystyrene): $M_w$=4,400, PDI=1.48.

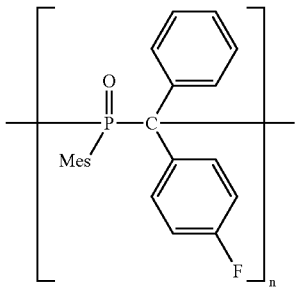

Preparation of poly(mesityl(4-methoxy)phenyl phosphine)

To a pyrex tube containing di(4-methoxy)phenyl-methylene mesityl phosphine (0.5 g, 1.4 mmol) was added MeLi (1.6 M, 0.05 ml, 0.07 mmol). The tube was flame sealed in vacuo and heated (150° C., 24 h) in an oven equipped with a rocking tray. The reaction mixture became increasingly viscous over the 24 h period. The polymerization was quenched with MeOH and the polymer was precipitated from THF with water (×1) and hexanes (×3). The isolated polymer was then oxidized by $H_2O_2$ and then dried. Yield=0.040 g (10%).

$^{31}P$ NMR ($CDCl_3$, 300 K): δ-11 (br), after oxidation: δ 44 (br). GPC (THF, vs. polystyrene): $M_w$=2,500 PDI=1.34.

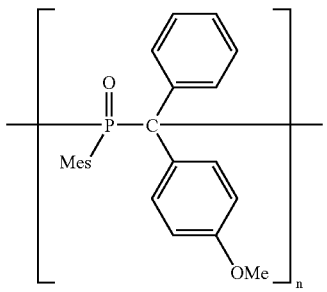

Preparation of poly(mesityl bis(4-methoxyphenyl)phosphine)

To a pyrex tube containing bis(4,4'-dimethoxy)phenyl-methylene mesityl phosphine (1.0 g, 2.7 mmol) was added MeLi (1.6 M, 0.05 ml, 0.07 mmol). The contents of the tube were immediately frozen (liquid nitrogen) and the tube was flame sealed in vacuo. The tube was heated (150° C., 24 h) in an oven equipped with a rocking tray. The reaction mixture became increasingly viscous over the 24 h period. The polymerization was quenched with MeOH and the polymer was precipitated from THF with water (×1) and hexanes (×3). The isolated polymer was then oxidized by $H_2O_2$ and then dried. Yield=0.05 g (5%).

$^{31}P$ NMR ($CDCl_3$, 300 K): δ-11 (br), after oxidation: δ 44 (br). GPC (THF, vs. polystyrene): $M_w$=3,600, PDI=1.28.

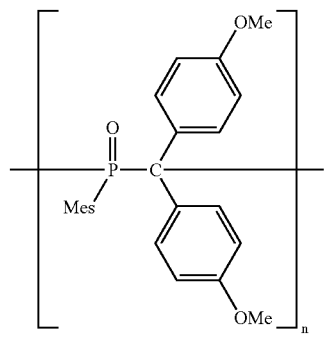

Co-polymer of methyl methacrylate and phosphaalkene

A glass tube was charged with methyl methacrylate (1.27 g, 12.6 mmol), diphenyl-methylene mesityl phosphine (1.0 g, 3.16 mmol) and 1,1'-Azobis(cyclohexanecarbonitrile) (VAZO® catalyst 88) (0.2 g, 0.8 mmol). The tube was flame sealed under vacuum and heated at 140° C. for 15 hours. The polymer was precipitated from $CH_2Cl_2$ into hexanes (×3). Yield (0.86 g, 38%).

$^{31}P$ NMR ($CDCl_3$, 300 K): δ 47 ppm. $^1H$ NMR ($CDCl_3$, 300 K): δ 6.2-7.8 (br), 3.6, 1.8 (br), 0.8-1.3 (br). % P incorporated ($^1H$ NMR)=2.3%; GPC analysis: $M_w$=16,100, PDI=2.4.

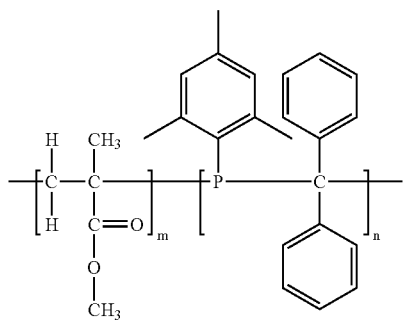

Co-polymer of 2-ethylhexylacrylate and phosphaalkene

A glass tube was charged with 2-ethyl-hexyl acrylate (2.33 g, 12.6 mmol), diphenyl-methylene mesityl phosphine (1.0 g, 3.16 mmol) and 1,1'-Azobis(cyclohexanecarbonitrile) (VAZO® catalyst 88) (0.193 g, 0.79 mmol). The tube was flame sealed under vacuum and heated at 140° C. for 15 hours. The polymer was precipitated from $CH_2Cl_2$ into methanol (×3). The isolated polymer was then oxidized by $H_2O_2$ and then dried. Yield (0.81 g, 24%).

$^{31}P$ NMR ($CDCl_3$, 300 K): δ 41.7 ppm. $^1H$ NMR ($CDCl_3$, 300 K): δ 7.15 (br), 3.90 (br), 2.26 (br), 1.87 (br), 1.55 (br), 1.25 (br), 0.86 (br). % P incorporated ($^1H$ NMR)=6.4%; GPC analysis: $M_w$=5300; PDI=1.6.

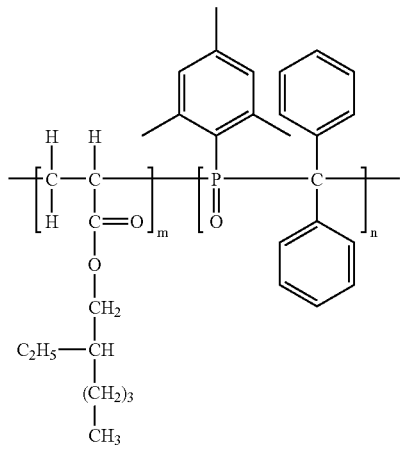

Co-polymer of butyl acrylate and phosphaalkene

A large pyrex tube was charged with butyl acrylate (1.62 g, 12.64 mmol), diphenyl-methylene mesityl phosphine (1.0 g, 3.16 mmol), and 1,1'-Azobis(cyclohexanecarbonitrile) (VAZO® catalyst 88) (0.193 g, 0.79 mmol). The tube was sealed under vacuum and heated at 120° C. for 15 hours. The polymer was precipitated from $CH_2Cl_2$ into methanol (×3). The isolated polymer was then oxidized by $H_2O_2$ and then dried. Yield (0.25 g, 10%).

$^{31}$P NMR ($CDCl_3$, 300 K): δ 42.2 ppm. $^1$H NMR ($CDCl_3$, 300 K): δ 7.17 (br), 4.02 (br), 2.26 (br), 1.87 (br), 1.68 (br), 1.57 (br), 1.35 (br), 0.91 (br). % P incorporated: 11%; GPC analysis: $M_w$=5400; PDI=2.11.

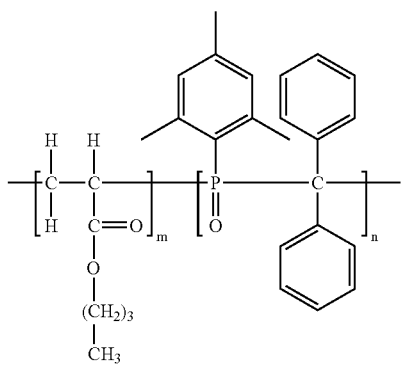

Co-polymer of styrene and phosphaalkene

A pyrex tube was charged with styrene (0.99 g, 9.5 mmol), diphenyl-methylene mesityl phosphine (0.8 g, 2.53 mmol), and 1,1'-azobis(cyclohexanecarbonitrile) (VAZO® catalyst 88) (0.10 g, 0.63 mmol). The tube was sealed under vacuum and heated at 130° C. for 3 hours. The polymer was precipitated from $CH_2Cl_2$ into methanol (×3). The isolated polymer was then oxidized by $H_2O_2$ and then dried. Yield (0.18 g, 10%).

$^{31}$P NMR ($CDCl_3$, 300 K): δ 44.4 ppm. $^1$H NMR ($CDCl_3$, 300 K): δ 6.4-7.4 (br), 4.7 (br), 3.4 (br), 2.2 (br), 1.9 (br), 1.5 (br). % P incorporated: 4.6% GPC analysis: $M_w$=3800; PDI=1.6.

Although the foregoing invention has been described in some detail by way of illustration and example for purposes of clarity of understanding, it will be readily apparent to those of skill in the art in light of the teachings of this invention that changes and modification may be made thereto without departing from the spirit or scope of the appended claims. All patents, patent applications and publications referred to herein are hereby incorporated by reference.

We claim:

1. A polymer comprising one or more of a unit having the formula:

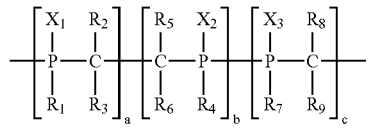

wherein:
each of a, b and c is an integer of zero or more and a+b+c equals at least 3;
each of $X_1$, $X_2$, and $X_3$ are the same or different and is an electron pair, a chalcogen, halogen, a Lewis acid, a metal ion, an ylide, an alkoxy, an azide, an alkyl or an alkyl halide;
each of $R_1$, $R_4$, and $R_7$ are the same or different and is a member selected from the group consisting of: a secondary alkyl; a tertiary alkyl; an alkyl substituted with cycloalkyl, trialkylsilyl, aryl or heteroaryl; an aryl; a heteroaryl; a cycloalkyl; and a heterocycloalkyl, wherein the member comprises at least 3 carbon atoms, heteroatoms if present are selected from —O—, —S—, and —N—, said alkyl, cycloalkyl, heterocycloalkyl, aryl and heteroaryl moieties are optionally substituted with halogen and alkoxy, and said aryl, heteroaryl, cycloalkyl and heterocycloalkyl moieties are optionally substituted with alkyl and alkyl halide; and
each of $R_2$, $R_3$, $R_5$, $R_6$, $R_8$ and $R_9$ are the same or different and is a member selected from the group consisting of: hydrogen; a primary, secondary, or tertiary alkyl; an alkyl substituted with cycloalkyl, trialkylsilyl, aryl or heteroaryl; an aryl; a heteroaryl; a cycloalkyl; and a heterocycloalkyl; wherein heteroatoms if present, are selected from —O—, —S—, and —N—, said alkyl, cycloalkyl, heterocycloalkyl, aryl and heteroaryl moieties are optionally substituted with halogen and alkoxy, and said aryl, heteroaryl, cycloalkyl and heterocycloalkyl moieties are optionally substituted with alkyl and alkyl halide.

2. The polymer of claim 1 having a backbone substantially consisting of alternating C and P atoms.

3. The polymer of claim 1 having a backbone comprising C—C bonds or P—P bonds.

4. The polymer of claim 1 having a backbone comprising P—P and C—P bonds.

5. A polymer comprising one or more of a unit having the formula:

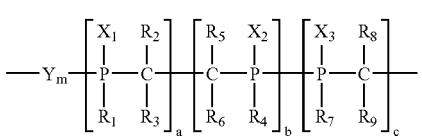

wherein:

each of a, b and c is an integer of zero or more and a+b+c equals at least 1;

each of $X_1$, $X_2$, and $X_3$ are the same or different and is an electron pair, a chalcogen, halogen, a Lewis acid, a metal ion, an ylide, an alkoxyl, an azide, an alkyl, or an alkyl halide;

each of $R_1$, and $R_7$ are the same or different and is a member selected from the group consisting of: a secondary alkyl, a tertiary alkyl; an alkyl substituted with cycloalkyl, trialkylsilyl, aryl or heteroaryl; an aryl; a heteroaryl; a cycloalkyl; and a heterocycloalkyl, wherein the member comprises at least 3 carbon atoms, heteroatoms if present are selected from —O—, —S—, and —N—, said alkyl, cycloalkyl, heterocycloalkyl, aryl and heteroaryl moieties are optionally substituted with halogen or alkoxy, and said aryl, heteroaryl, cycloalkyl and heterocycloalkyl moieties are optionally substituted with alkyl and alkyl halide;

each of $R_2$, $R_3$, $R_5$, $R_6$, $R_8$ and $R_9$ are the same or different and is a member selected from the group consisting of: hydrogen; a primary, secondary, or tertiary alkyl; an alkyl substituted with cycloalkyl, trialkylsilyl, aryl or heteroaryl; an aryl; a heteroaryl; a cycloalkyl; and a heterocycloalkyl, wherein heteroatoms if present are selected from —O—, —S—, and —N—, said alkyl, cycloalkyl, heterocycloalkyl, aryl and heteroaryl moieties are optionally substituted with halogen or alkoxy, and said aryl, heteroaryl, cycloalkyl and heterocycloalkyl moieties are optionally substituted with alkyl and alkyl halide; and Y is a monomer unit of a polyolefin and m is an integer of at least one.

6. The polymer of claim 5 wherein Y is from an acrylate monomer.

7. The polymer of claim 5 wherein Y is from a styrene monomer.

8. The polymer of claim 5 wherein Y is from an alkene monomer.

9. The polymer of claim 5, comprising monomer units from different polyolefins.

10. The polymer of claim 5, wherein a+b+c is 3 or more.

11. The polymer of claim 1, wherein a+b+c is 4 or more.

12. The polymer of claim 1, wherein a+b+c is 5 or more.

13. The polymer of claim 1, wherein a+b+c is 10 or more.

14. The polymer of claim 1, wherein $R_2$-$R_9$ is hydrogen.

15. The polymer of claim 1, wherein $R_3$, $R_6$, and $R_9$ are not hydrogen.

16. The polymer of claim 15, wherein $R_3$, $R_6$, and $R_9$ are independently: a tertiary alkyl, phenyl, or heteroaryl, wherein phenyl and heteroaryl are optionally substituted with alkyl, and alkyl, tertiary alkyl, phenyl and heteroaryl are optionally substituted with alkoxy or halogen.

17. The polymer of claim 16 wherein $R_2$, $R_5$, and $R_8$ are independently hydrogen, methyl, ethyl, butyl or a moiety from within the definition of $R_3$, $R_6$, and $R_9$.

18. The polymer of claim 1, wherein $R_1$, $R_4$, and $R_7$ are independently a tertiary alkyl, phenyl, or heteroaryl, wherein phenyl and heteroaryl are optionally substituted with alkyl, and alkyl, tertiary alkyl, phenyl, and heteroaryl are optionally substituted with halogen or alkoxy.

19. The polymer of claim 18 wherein $R_1$, $R_4$, and $R_7$ are independently tert-butyl, phenyl, or phenyl substituted with from 1 to 3 $C_1$-$C_4$ alkyl groups.

20. The polymer of claim 1, wherein $X_1$, $X_2$, and $X_3$ are electron pairs.

21. The polymer of claim 1, wherein one or more of $X_1$, $X_2$, and $X_3$ are not electron pairs.

22. The polymer of claim 21 wherein one or more of $X_1$, $X_2$, and $X_3$ are O, S, a borane or a metal ion.

* * * * *

UNITED STATES PATENT AND TRADEMARK OFFICE
CERTIFICATE OF CORRECTION

| | | |
|---|---|---|
| PATENT NO. | : 7,728,091 B2 | Page 1 of 1 |
| APPLICATION NO. | : 10/539397 | |
| DATED | : June 1, 2010 | |
| INVENTOR(S) | : Gates et al. | |

It is certified that error appears in the above-identified patent and that said Letters Patent is hereby corrected as shown below:

In the Claims:

Column 23, Claim 5, line 8      Delete "$R_1$ and $R_7$"
                                Insert -- $R_1$, $R_4$ and $R_7$ --

Signed and Sealed this
Twenty-seventh Day of September, 2011

David J. Kappos
*Director of the United States Patent and Trademark Office*